United States Patent
Dolezal et al.

(10) Patent No.: US 10,538,378 B2
(45) Date of Patent: Jan. 21, 2020

(54) FLUID DISPENSING DEVICE

(71) Applicant: ICP Adhesives and Sealants, Inc., Norton, OH (US)

(72) Inventors: Christopher D. Dolezal, Canton, OH (US); Karl W. Burkart, Akron, OH (US)

(73) Assignee: ICP Adhesives and Sealants, Inc., Norton, OH (US)

( * ) Notice: Subject to any disclaimer, the term of this patent is extended or adjusted under 35 U.S.C. 154(b) by 0 days.

(21) Appl. No.: 16/295,318

(22) Filed: Mar. 26, 2019

(65) Prior Publication Data

US 2019/0263584 A1 Aug. 29, 2019

Related U.S. Application Data

(62) Division of application No. 15/903,368, filed on Feb. 3, 2018, now Pat. No. 10,351,334.

(51) Int. Cl.
| | |
|---|---|
| *B65D 83/20* | (2006.01) |
| *B65D 83/14* | (2006.01) |
| *B29C 44/36* | (2006.01) |
| *B05B 1/00* | (2006.01) |
| *B05B 7/12* | (2006.01) |
| *B29B 7/74* | (2006.01) |
| *G01K 11/16* | (2006.01) |
| *B05B 7/04* | (2006.01) |
| *B29K 75/00* | (2006.01) |
| *B29L 31/10* | (2006.01) |

(52) U.S. Cl.
CPC ............ *B65D 83/203* (2013.01); *B05B 1/005* (2013.01); *B05B 7/0408* (2013.01); *B05B 7/1218* (2013.01); *B29B 7/7438* (2013.01); *B29C 44/367* (2013.01); *B65D 83/207* (2013.01); *B65D 83/752* (2013.01); *G01K 11/165* (2013.01); *B01F 2215/0039* (2013.01); *B29B 7/7404* (2013.01); *B29K 2075/00* (2013.01); *B29L 2031/10* (2013.01)

(58) Field of Classification Search
CPC ..... B65D 83/203; B05B 1/005; B05B 7/0408; B05B 7/1218; B29B 7/7438; B29C 44/367; G01K 11/165; B01F 2215/0039; B29K 2075/00; B29L 2031/10
USPC ...................................................... 222/402.1
See application file for complete search history.

(56) References Cited

U.S. PATENT DOCUMENTS

| | | |
|---|---|---|
| 26,305,010 | 4/1953 | Sanders et al. |
| 3,146,950 A | 9/1964 | Lancaster |
| 3,185,350 A | 5/1965 | Abplanalp et al. |
| 3,249,260 A | 5/1966 | Goldberg |

(Continued)

OTHER PUBLICATIONS

PCT Search Report for PCT/US2017/052630.

(Continued)

*Primary Examiner* — Benjamin R Shaw
(74) *Attorney, Agent, or Firm* — Fisherbroyles LLP; Louis F. Wagner

(57) ABSTRACT

The invention pertains generally to an improved fluid dispensing device, particularly a dispensing device which employs at least one hemispherical domed cannister source of reactants and which uses a color-changing dispensing plastic tip to inform the end-user if the reactants are at a proper use temperature.

9 Claims, 22 Drawing Sheets

(56) References Cited

U.S. PATENT DOCUMENTS

| | | | | |
|---|---|---|---|---|
| 3,395,838 A * | 8/1968 | Beres | B65D 83/756 | 222/402.14 |
| 3,608,791 A | 9/1971 | Jordan et al. | | |
| 3,633,795 A * | 1/1972 | Brooks | B05B 7/1209 | 222/134 |
| 3,650,479 A | 3/1972 | Leidberg | | |
| 3,838,578 A | 10/1974 | Sakasegawa et al. | | |
| 3,848,778 A | 11/1974 | Meshberg | | |
| 4,169,545 A | 2/1979 | Decker | | |
| 4,399,930 A * | 8/1983 | Harding | B05B 7/0408 | 222/145.7 |
| 4,458,831 A * | 7/1984 | Holleran | B05B 7/0408 | 222/134 |
| 4,496,081 A * | 1/1985 | Farrey | B05B 1/30 | 222/135 |
| 4,676,437 A * | 6/1987 | Brown | B29B 7/7438 | 239/414 |
| 4,925,107 A * | 5/1990 | Brown | B29B 7/7438 | 239/414 |
| 5,129,581 A * | 7/1992 | Braun | B29B 7/7438 | 239/414 |
| 5,242,115 A | 9/1993 | Brown | | |
| 5,388,730 A | 2/1995 | Abbott et al. | | |
| 5,429,308 A | 7/1995 | Brown | | |
| 5,462,204 A | 10/1995 | Finn et al. | | |
| 5,529,245 A * | 6/1996 | Brown | B05B 7/1209 | 239/390 |
| 5,924,599 A * | 7/1999 | Brown | B05B 7/2467 | 222/135 |
| 6,021,961 A * | 2/2000 | Brown | B29B 7/7438 | 239/398 |
| 6,158,624 A * | 12/2000 | Grigg | B01F 13/0027 | 222/145.6 |
| 6,182,868 B1 | 2/2001 | Hurray et al. | | |
| 6,311,869 B1 * | 11/2001 | Horth | A61C 9/0026 | 222/137 |
| 6,345,776 B1 * | 2/2002 | Hurray | B05B 12/0024 | 239/413 |
| 6,431,468 B1 * | 8/2002 | Brown | B05B 7/1209 | 239/526 |
| 6,691,898 B2 | 2/2004 | Hurray et al. | | |
| 6,840,462 B2 | 1/2005 | Hurray et al. | | |
| 8,100,295 B2 * | 1/2012 | Keller | B05C 17/00506 | 222/137 |
| 8,177,451 B2 | 5/2012 | Park | | |
| 8,875,951 B2 | 11/2014 | Houser | | |
| 9,079,197 B2 * | 7/2015 | Bina | B05B 7/0408 | |
| 9,211,552 B2 | 12/2015 | Gantenbein et al. | | |
| 9,546,037 B1 | 1/2017 | Armes et al. | | |
| 9,751,100 B2 | 9/2017 | Joseph et al. | | |
| 2002/0074357 A1 * | 6/2002 | Karr | B65D 83/207 | 222/190 |
| 2002/0109019 A1 * | 8/2002 | May | B05B 1/3046 | 239/328 |
| 2002/0137871 A1 | 9/2002 | Wheeler, Jr. | | |
| 2005/0035220 A1 | 2/2005 | Brown | | |
| 2006/0192033 A1 * | 8/2006 | Dansizen | B01F 5/0619 | 239/414 |
| 2007/0095939 A1 | 5/2007 | Saunders et al. | | |
| 2008/0296398 A1 | 12/2008 | Hickman et al. | | |
| 2009/0306674 A1 | 12/2009 | Chandler | | |
| 2010/0065130 A1 | 3/2010 | Swab et al. | | |
| 2011/0209780 A1 * | 9/2011 | Gantenbein | B05B 12/002 | 137/539 |
| 2014/0034756 A1 * | 2/2014 | Gantenbein | B05B 7/0408 | 239/416.1 |
| 2014/0339320 A1 * | 11/2014 | Gantenbein | B05B 7/0018 | 239/1 |
| 2014/0339327 A1 * | 11/2014 | Gantenbein | B05B 7/0018 | 239/71 |
| 2015/0273516 A1 * | 10/2015 | Starr | A23G 3/28 | 222/1 |
| 2016/0074886 A1 | 3/2016 | Gantenbein et al. | | |
| 2016/0376090 A1 * | 12/2016 | Armes | B05B 7/0408 | 222/23 |
| 2018/0043379 A1 * | 2/2018 | Gantenbein | B05B 7/025 | |

OTHER PUBLICATIONS

PCT Written Opinion for PCT/U52017/052630.
Froth-PakTM Ultra Premium Foam Insulation System bearing a copyright date of 2014 on the last page.
Froth-PakTM Ultra Premium Foam Insulation Manual bearing an edition date of 2015 on the first page.

\* cited by examiner

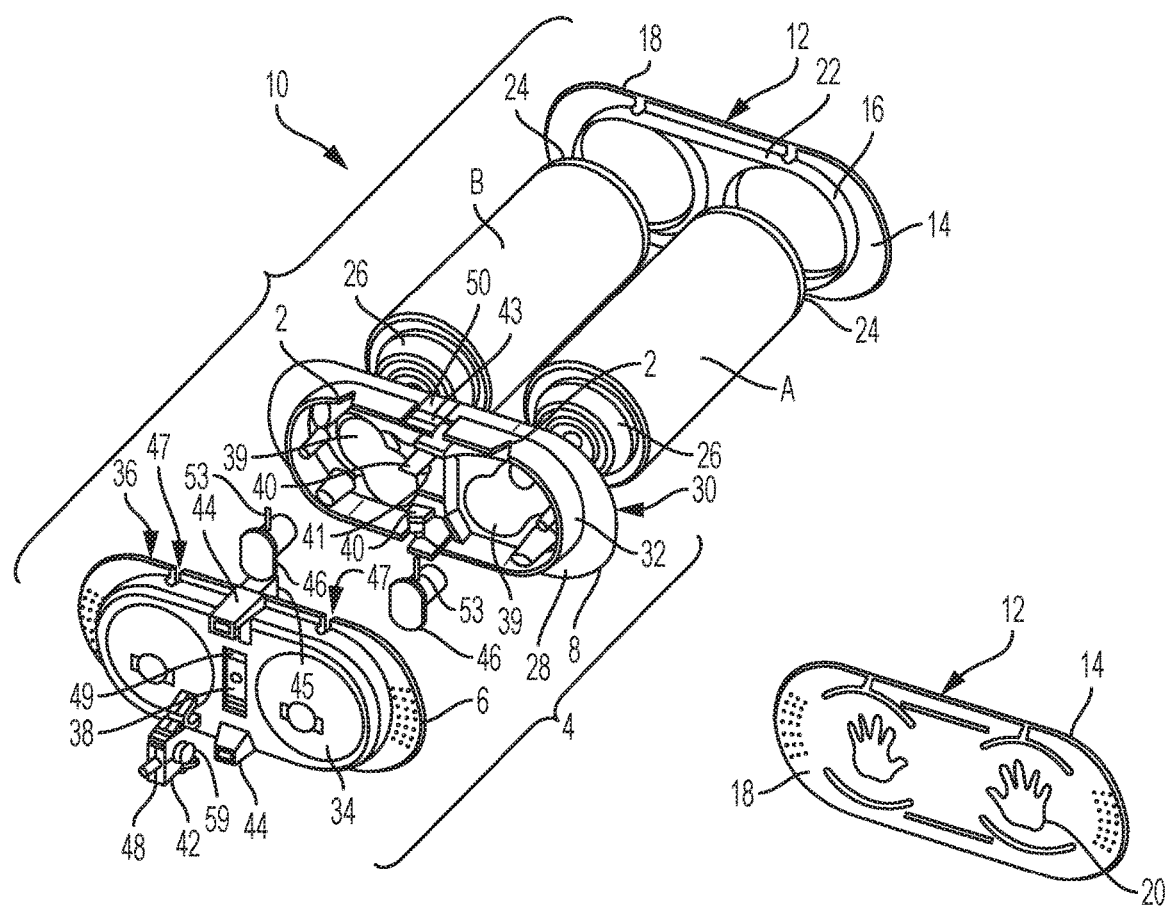
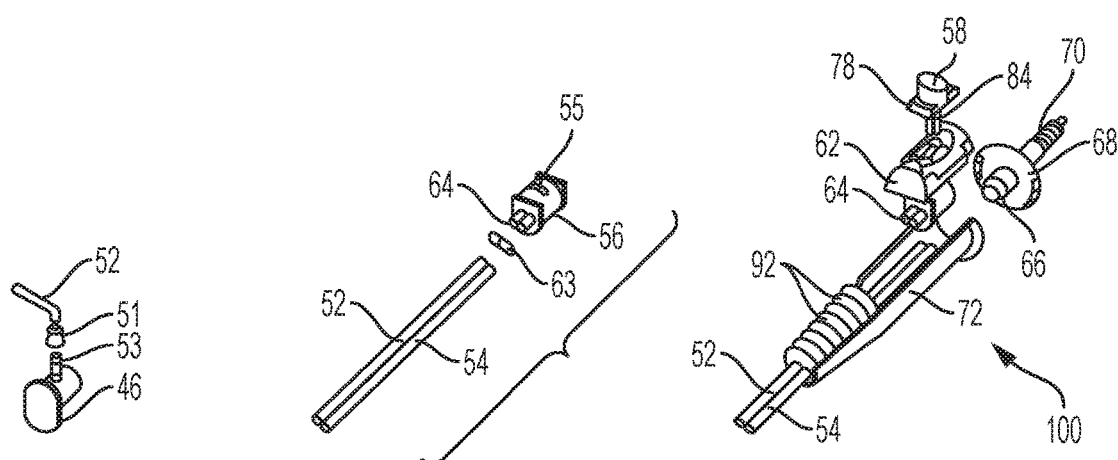
FIG. 1 PRIOR ART
FIG. 2 PRIOR ART
FIG. 3 PRIOR ART
FIG. 4 PRIOR ART
FIG. 5 PRIOR ART

FLUID DISPENSING DEVICE

CROSS-REFERENCE TO RELATED APPLICATIONS

This application is a divisional application of co-pending patent application Ser. No. 15/903,368 filed on 23 Feb. 2018.

TECHNICAL FIELD

The invention described herein pertains generally to an improved fluid dispensing device, e.g., a one-component or two-component polyurethane foam.

BACKGROUND OF THE INVENTION

The invention relates generally to a pressurized chemical dispensing apparatus, and more particularly to a hand-held apparatus particularly suitable for use in dispensing two-component systems, more particularly urethane foams, wherein the apparatus includes a dispensing assembly interconnected to the canister supplies. Optionally the apparatus is contained within a kit which permits one-handed operation.

The use of urethane and similar expandable foams has increased over the years for numerous applications. Urethane foams are well known as having desirable characteristics useful for many applications, such as insulation, adhesives or sealants. Urethane foams are also well known for their compatibility with low cost blowing agents which allow such foams to be applied by way of pressurized containers as well as their natural adhesive qualities which allow such foams to bond excellently to any number of substrates. Typically, urethane foams are the reaction product of two individual components, one being an isocyanate and the other being a resin. These two individual components when reacted together under pressure, give the resultant foam various chemical compositions, each such composition having significant utility in a particular application. Thus, urethane foams may be specially formulated to provide a final foam which is rigid, semi-rigid or flexible.

Closed cell urethane foams have particular utility in building and structural insulation while open cell urethane foams have particular utility in packaging or non-insulating purposes. Regardless of cell structure, two-component urethane foams are typically formed by mixing the two or more individual foam components together when the foam components exit respective supply containers. Individual material supply tubes leading from each foam component container convey the foam components to a foam dispensing apparatus, such as a nozzle.

There are numerous applications in which polyurethane foam is used at a site for any number of applications in addition to its traditional use in the building trades as a source of insulation. Recently polyurethane foam has become used with increasing frequency as a sealant in the building trades for sealing spaces between window and door frames and the like and as an adhesive for gluing flooring and roof tiles and the like. The polyurethane foam for such in-situ applications is typically supplied as a one-component froth foam or a two-component froth foam. A one-component foam means that both the resin and isocyanate for the foam is supplied in a single pressurized container and dispensed from the container through a valve or gun attached to the container. A two-component "froth" foam means that one component is supplied in one pressurized container, typically the "A" container (i.e., polymeric isocyanate, fluorocarbons etc) while the resin is supplied in a second pressurized container, typically the "B" container (i.e., polyols, catalyst, flame retardants etc.). Typically, two-component kits use pressurized cylinders which are connected by hoses to a dispensing gun. There are advantages and disadvantages to one-component and two-component foams. One of the advantages of the two-component system is its relatively long shelf life resulting from the fact that the chemicals are not mixed until they encounter one-another in the dispensing gun.

One application for a hand-held, portable two-component polyurethane froth foam kit exists in the mining industry. In the event of a fire in a shaft being tunneled, standard procedure is to extinguish the fire by sealing the shaft with a fire "door" and then pumping out from the shaft sealed by the door, the air in the shaft to extinguish the fire. It has been found that polyurethane foam is excellent for sealing the bulkhead or door to the tunnel. As already noted, the polyurethane foam has an adhesive characteristic and the foam can be formulated to provide a relatively quick tack free time with little permeability for gas escape. Surprisingly, the fire door is not adjacent an open flame, and whatever temperature the gases exhausted from the shaft are, they are not sufficiently high in temperature to disintegrate the foam. Because of its long shelf life, a two-component foam is ideal for this application. Standard procedure is to simply provide two-component kits at the shaft being tunneled to seal and secure the fire door or bulkhead to the shaft in the event of a fire.

Different packaging arrangements are used by different manufacturers. Many two-component kit packages use some form of tray with knock-out holes through which the hoses extend after the box is opened and the hoses attached to the cylinder's valved fitting. However, there is at least one two-component polyurethane froth foam box which utilizes cylinders equipped with "dip tubes" which extend through the outlet valve from the inside bottom of the cylinder. This allows the cylinders to be placed upright in the box instead of upside down. This carton does not use a tray and has the hoses extend out the side of the box through knock-out plugs. The carton is carried by a strap affixed to the top cover. The top cover is a flap which has to be opened and closed to gain access to the cylinder's valve after the hoses are connected to the cylinders.

What has been missing from the Prior Art however, is a foam dispensing device which couples both fail-safe operation by a two-stage activation procedure, coupled with a dispensing mechanism whereby the dispensing means: is biased into a closed position; is actuated by rotational movement about a cannister longitudinal axis; has an extendable nozzle extension; and has a means for preventing hose deformation/crimping during shipment.

SUMMARY OF THE INVENTION

The invention is directed to an easily assembled foam dispensing apparatus in which two foam component supply containers are held in place by an carrier assembly which includes a dispensing trigger assembly which is separate from the carrier assembly.

In one aspect of the Prior Art as illustrated in FIGS. 1-7, the entire dispensing apparatus and carrier unit is contained in a carrying case. The carrying case contains two foam component supply canisters and an actuating assembly in the form of two foam component supply tubes, each having a predefined length which is sufficient to permit a dispensing assembly attached to the supply tubes to be operated remotely from the carrying case while interconnected thereto. The material supply tubes, dispensing assembly and one or more detachable dispensing nozzles are positioned within a designated area within the carrying case so that the apparatus may be sold as a single unit or kit. The case not only functions as a carrier assembly for the dispensing apparatus, but may also function as a shipping container therefor or as a display case.

In one aspect of the invention, a fluid dispensing apparatus is described which includes: at least one elongated cylinder; a longitudinally axial sliding valve in a hemispherical dome of each cannister, the valve biased in a closed position; a cylinder actuator bottom for each cannister, each cylinder actuator bottom having a centrally disposed cylinder actuator bottom aperture disposed therein and an outer cylindrical collar, the collar having at least two first detents positioned about the exterior of the collar, each detent connected to a descending peripheral slot which extends about a portion of the periphery of the collar and which terminates toward a base of the cylinder actuator bottom; a cylinder actuator top for each cannister, each having a centrally disposed cylinder actuator top aperture disposed therein, the cylinder actuator top aperture in sliding engagement with the cylinder actuator bottom aperture, the cylinder actuator top having at least two resiliently movable fingers, each finger having a projection extending into an interior of the cylinder actuator top, the finger projection in initial axial mating engagement with the at least two first detents and subsequent sliding engagement with the descending peripheral slot of each detent by rotational movement of the cylinder actuator top, the rotational movement effecting downward pressure on the valve of each cannister to position the valve in an open position; the fluid dispensing apparatus having an elongated housing: the housing having a rear and a front and a removable nozzle connector; at least one deformable plastic hose in leak-proof communication with the valve of each cannister at one end and in leak-proof communication with a rear inlet of the removable nozzle connector for a nozzle at an opposed end; the nozzle connector comprising: a means for removable mating engagement with a front of the elongated housing of the fluid dispensing apparatus and a mating means at a rear end of the nozzle connector; a means for removable mating engagement with a tapered plastic tip at a front of the nozzle connector; and a removable hose crimping prevention means for maintaining the at least one plastic hose with less than full deformation during storage or shipment, the hose crimping prevention means positioned between the bottom of the housing and a pivotable trigger of the spray apparatus.

Preferably, the plastic tip is a color-changing tip which comprises at least one thermochromic material selected from the group consisting of at least one liquid crystal or at least one leuco dye. Preferably, the at least one thermochromic material is at least two thermochromic materials disposed within the plastic tip or thereupon the at least one plastic hose, each of said at least two thermochromic materials effecting a color change at a different temperature. In yet another aspect, the at least one thermochromic material is at least three thermochromic materials disposed within the plastic tip or thereupon the at least one plastic hose, each of said at least three thermochromic materials effecting a color change at a different temperature.

The container for the above is of sufficient length and width to contain the at least one elongated cylinder, and often two elongated cylinders. The elongated cylinders may comprise an "A" and a "B" cylinder for a two-component polyurethane foam, but may also include a single cylinder for a one-component polyurethane foam or two cylinders, each having the same or different composition for a one-component foam. While polyurethane foams are the targeted application, the application is not limited to foams or to polyurethane, but includes all pressurized fluid dispensing applications in which the cylinders either contain all of the reactants or some of the reactants, or even different reactants depending on the targeted end-use application.

In another aspect, the removable hose crimping prevention means is an elongated plastic insert having an extension at one end and the nozzle connector is completely disengageable from the housing.

In another embodiment, the fluid dispensing kit includes: at least one elongated cylinder; a longitudinally axial sliding valve in a hemispherical dome of each cannister, the valve biased in a closed position; a cylinder actuator bottom for each cannister, each cylinder actuator bottom having a centrally disposed cylinder actuator bottom aperture disposed therein and an outer cylindrical collar, the collar having at least two first detents positioned about the exterior of the collar, each detent connected to a descending peripheral slot which extends about a portion of the periphery of the collar and which terminates toward a base of the cylinder actuator bottom; a cylinder actuator top for each cannister, each having a centrally disposed cylinder actuator top aperture disposed therein, the cylinder actuator top aperture in sliding engagement with the cylinder actuator bottom aperture, the cylinder actuator top having at least two resiliently movable fingers, each finger having a projection extending into an interior of the cylinder actuator top, the finger projection in initial axial mating engagement with the at least two first detents and subsequent sliding engagement with the descending peripheral slot of each detent by rotational movement of the cylinder actuator top, the rotational movement effecting downward pressure on the valve of each cannister to position the valve in an open position; the fluid dispensing apparatus comprising an elongated housing: the housing having a rear and a front and a removable nozzle connector; at least one deformable plastic hose in leak-proof communication with the valve of each cannister at one end and in leak-proof communication with a rear inlet of the removable nozzle connector for a nozzle at an opposed end; the nozzle connector comprising: a means for removable mating engagement with a front of the elongated housing of the fluid dispensing apparatus and a mating means at a rear end of the nozzle connector; a means for removable mating engagement with a tapered plastic tip at a front of the nozzle connector; a removable hose crimping prevention means for maintaining the at least one plastic hose with less than full deformation during storage or shipment, the hose crimping prevention means positioned between the bottom of the housing and a pivotable trigger of the spray apparatus; the rectangular container with a pivotable top into which is positioned the at least one elongated cylinder, each having the longitudinally axial sliding valve in the hemispherical dome of each cannister, the cylinder actuator bottom, the cylinder actuator top, the fluid dispensing apparatus, and the removable hose crimping prevention means, at least a portion of which extends through a side wall of the container.

The kit preferably includes at least one plastic tip which is a color-changing tip.

Another aspect of the invention includes a hemispherical cylinder valve opening device which comprises: a cylinder actuator bottom for each cannister, each having a centrally disposed cylinder actuator bottom aperture disposed therein and an outer cylindrical collar, the collar having at least two first detents positioned about the exterior of the collar, each detent connected to a descending peripheral slot which extends about a portion of the periphery of the collar; and a cylinder actuator top for each cannister, each having a centrally disposed cylinder actuator top aperture disposed therein, the cylinder actuator top aperture in sliding engagement with the cylinder actuator bottom aperture, the cylinder actuator top having at least two resiliently movable fingers, each finger having a projection extending into an interior of the cylinder actuator top, the finger projection in initial axial mating engagement with the first detent and subsequent sliding engagement with the descending peripheral slot and second detent by rotational movement of the cylinder actuator top, the rotational movement effecting downward pressure on the valve of each cannister to position the valve in an open position.

The cylinder valve opening device will include a plurality of detents at various locations. In one aspect, a second detent is adjacent the first detent and a third detent at an end of the descending peripheral slot of the cylinder actuator bottom. The cylinder valve opening device will have a plurality of ribs which extend peripherally from the centrally disposed cylinder actuator bottom aperture and extend to the outer cylindrical collar.

In an aspect of the invention, the cylinder actuator bottom for each cannister has at least three detents positioned about the exterior of the collar, each detent connected to the descending peripheral slot which extends about a portion of the periphery of the collar; and a cylinder actuator top for each cannister wherein each cylinder actuator top has at least three resiliently movable fingers for insertion into each of the at least three detents in the cylinder actuator bottom.

The invention includes a spray wand which comprises: an essentially hollow elongated housing having a rear and a front; a pivotable trigger biased in a forward direction; at least one deformable plastic hose in leak-proof communication with a valve of at least one supply cannister at one end and in leak-proof communication with a rear inlet of a removable nozzle connector for a nozzle at an opposed end; the nozzle connector including: a means for removable mating engagement with the front of the housing at a rear end of the nozzle connector; a means for removable mating engagement with a tapered wand tip at a front of the nozzle connector; a removable hose crimping prevention means for maintaining the at least one plastic hose with less than full deformation during storage or shipment, the hose crimping prevention means positioned between the bottom of the housing and the pivotable trigger of the spray wand, thereby preventing full forward extension while the crimping prevention means is positioned therein.

In one version of the above, the spray wand means for removable mating engagement with the front of the housing at a rear end of the nozzle connector is a mating semicircular female slot with a semicircular housing. The spray wand means for removable mating engagement with a tapered wand tip at the front of the nozzle connector is a mating pair of wings at a rear of the tapered wand tip with a pair of receiving slots at the front of the nozzle connector.

The fluid dispensing device will further include a means to prevent crimping of a hose within a dispensing wand comprising: an elongated essentially hollow housing having a front and a back, the housing containing at least one deformable plastic tube in fluid connection with a pressurized source of reactants and a dispensing nozzle at the front; a pivotable forwardly-biased trigger attached to a bottom of the hollow housing, the trigger having a forward-extending projection, the trigger controlling a flow of fluid within the at least one deformable plastic tube by the interaction of a fixed v-shaped projection from the top of the housing and a movable projection at a top of the trigger; a crimping minimization means positioned between the bottom of the hollow housing and a top surface of the forward-extending projection, the crimping minimization means prohibiting full forward extension of the trigger, the crimping minimization means maintaining at least a partial opening of the at least one plastic tube.

The crimping minimization means is a plastic insert, the insert having a body and a forward-extending projection, a length of the forward-extending projection being sufficient to extend through a side wall of a rectangular container housing the device during shipment.

Additionally, the invention encompasses a kit comprising: an enclosed container having a lid, the lid being pivotable or removable from the container; at least one elongated pressurized cylinder within the container, the cylinder having a hemispherical domed top and a valve; at least one pair of mating cylinder actuators, the pair of cylinder actuators depressing the cylinder valve by rotational movement of at least one actuator; a deformable plastic hose positioned to each cylinder valve at one end and positioned to a rear of a removable wand assembly at an opposed end; the wand assembly removably engaging a front of a housing of the wand assembly; the wand assembly further comprising a pivotable trigger for flow control, the trigger biased in a closed forward position; and the wand assembly stored and shipped with the trigger in at least a partial open position by the insertion of an anti-crimping hose deformation means positioned between the trigger and a bottom of the housing of the wand assembly.

These and other objects of the present invention will become more readily apparent from a reading of the following detailed description taken in conjunction with the accompanying drawings wherein like reference numerals indicate the parts and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 1 is an assembly view of the two-component system of the Prior Art showing two aerosol cans positioned within a two part top housing plate and a bottom canister positioning plate;

FIG. 2 is a perspective view of the bottom side of the canister positioning plate of the Prior Art;

FIG. 3 is an assembly view of a valve depressor for one aerosol dispensing valve of the Prior Art;

FIG. 4 is an assembly view of the shut-off valve housing within the dispensing nozzle of the Prior Art;

FIG. 5 is an assembly view of a push button dispensing nozzle of the Prior Art;

DETAILED DESCRIPTION

Figure 6:
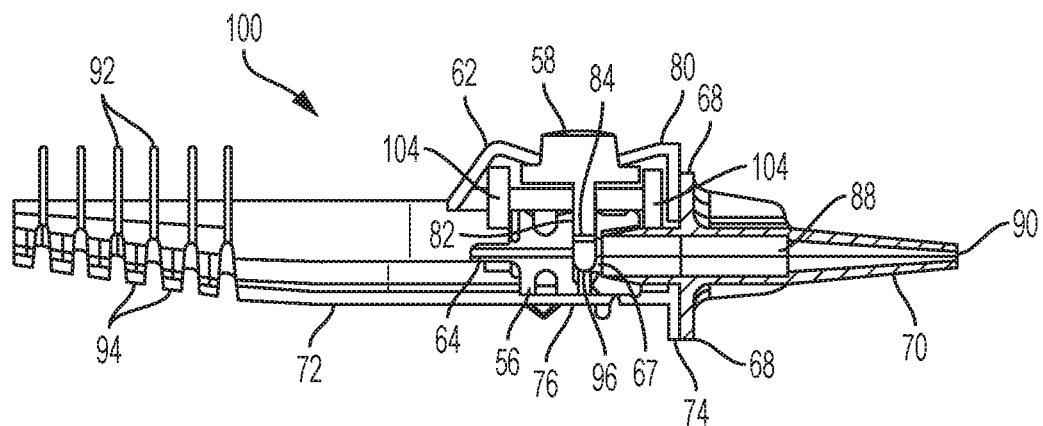
FIG. 6 is a side elevational view in partial cross-section showing the push button dispensing nozzle of the Prior Art in the closed position.

Unless the context clearly indicates otherwise: the word "and" indicates the conjunctive; the word "or" indicates the disjunctive; when the article is phrased in the disjunctive, followed by the words "or both" or "combinations thereof" both the conjunctive and disjunctive are intended.

As used in this application, the term "approximately" is within 10% of the stated value, except where noted. The terms "cylinder" and "cannister" are used interchangeably and synonymously.

Referring now to the drawings wherein the showings are for purposes of illustrating the preferred embodiment of the invention only and not for purposes of limiting the same, the Figures preferably show a two-component portable polyurethane foam apparatus, optionally for inclusion in kit form. It is to be understood that the words "container" or "box" or case or kit are, for purposes of this description, identical and are used interchangeably throughout the specification in describing the combination of the foam dispensing system plus carrying case. While the preferred application is a two-component polyurethane foam, there is no need to limit the invention to the same. It is envisioned that both one-component and two-component fluid-dispensing devices are within the scope of this invention.

The portable two-component polyurethane foam kit includes two cylinders, typically an "A" cylinder, which contains a polymeric isocyanate and a "B" cylinder, which contains a polyol amine or resin. Formulations within each cylinder can vary significantly depending on the application. For example, adhesive applications produce a polyurethane foam which has very little, if any, "foam" while insulation applications use a formulation which produces a significant rise in the foam. Usually, portable, hand carried two-component polyurethane foam kits dispense the chemicals from the dispensing apparatus as a "froth" having a consistency or texture similar to that dispensed from an aerosol can of shaving cream. All such variations in the formulations of polyurethane and whether the chemicals are dispensed as a spray or froth are included within the scope of the present invention so long as the formulations are supplied in a portable, hand-carry form.

As illustrated in the Prior Art of FIGS. 1-7, a two-component fluid (e.g., polyurethane foam) dispensing holder assembly 10 is shown illustrating an A aerosol component and a B aerosol component. The dispensing holder assembly 10 has an elongated oval canister positioning plate 12 having a top 14 and a bottom 18 side as well as an elongated oval two component top housing assembly 4 having an upper housing 6 and a lower housing 8. Canister positioning plate 12 has a pair of raised circular ridges 16 on the top side 14 of the canister positioning plate which are dimensioned for frictional engagement with either of the circular aerosol can bottoms 24. Optionally, the raised circular ridges will have an inwardly facing notch (not shown) at a bottom thereof for mating engagement with the peripherally extending canister lip when fully inserted into canister positioning plate 12. Optionally a pair of supporting ribs 22 connect each raised circular ridge at a peripheral point thereupon. For ease of use in a multilingual environment, bottom side 18 of canister positioning plate 12 has a pair of hands 20 imprinted or molded thereunto to illustrate the location of an end-user's hands to effect longitudinal axial actuating movement of the valves positioned upon aerosol canisters A and B for the aerosol components which make up the two-component polyurethane foam. Upon longitudinal axial compression, the aerosol system is transformed from its inactive state into an active state ready-for-use due to corresponding longitudinal axial compressive movement of the valves positioned at the top of each aerosol can.

Bottom housing 8 of the two-component top housing assembly 4 will have an elongated bottom side 28 and a pair of openings 39 for insertion of the top (valve side) of canisters A and B through bottom side 30 of lower housing 8 with securing frictional engagement with a circular ridge on each dome-shaped circular top 26 of aerosol cans A and B as well as two pairs of resilient flexible upwardly-directed clips 40 (inner), 50 (outer). Outer clips 50 have a detent 43 for engagement with inwardly facing hook member 45 of downwardly facing latch member 44 which when engaged with detent 43, secure the top 6 with elongated bottom side 36 and bottom 8 housings of two component top housing assembly 4 together at a predefined spaced apart distance when the dispensing system is in its inactivated state. When transitioning from the inactive to the active state, hook 45 of latch member 44 is disengaged from detent 43 by inward compressive movement of outer clips 50 coupled with further longitudinal axial compression. Complete aerosol activation via aerosol valve depression is achieved when mating engagement is effected between protruding lips 41 on inner clips 40 with lowered top surface 38 after penetration through a pair of receiving apertures 49 disposed on opposed ends of lowered surface 38 and inwardly disposed oval ridge 32 of bottom housing 8 moves via sliding engagement toward the top of raised portion 34. A pair of indentations 2 are disposed within oval ridge 32 and positioned in proximity to ribbed exit port 53 positioned at the top of each outlet for each aerosol can for egress of a flexible plastic tube 52, 54 affixed to each aerosol dispensing valve 46 positioned on top of each valve stem of each aerosol cylinder.

Figure 7:
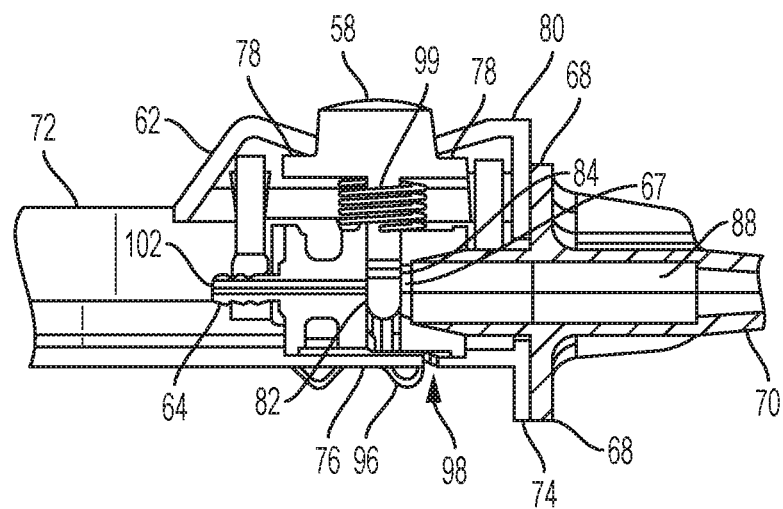
FIG. 7 is an enlarged side elevational view in partial cross-section showing the push button dispensing nozzle of the Prior Art in a closed position with supplemental outwardly biased spring.

As illustrated in FIG. 3, each aerosol dispensing valve 46 has an apertured bottom dimensioned for frictional engagement with an outer periphery of a valve stem of the aerosol can and a ribbed exit port 53 for affixing a plastic hose 52, 54 thereto via securing rings 51 for transporting the contents of either aerosol can A or B to a dispensing nozzle as illustrated in FIGS. 4-5, by egress of said tubing through indentations 2 of oval ridge 32 and cut-out portions 47 of raised portion 34 of upper housing 6. Each tube enters an upper 92 and lower 94 finned rear end 72 of the dispenser 100 through a pair of ribbed inlet ports 64 and secured by a pair of securing rings 63 for ingress of fluid into chamber 56 having a vertically oriented axial bore 55 disposed therethrough (see FIG. 4), a pair of ribbed inlet ports 64 and one outlet bore 67 as illustrated in FIGS. 5-7. Each aerosol dispensing valve 46 is securely fastened to raised portion 34 by retaining clips (not shown) extending downwardly from the raised portion and which engage a peripheral edge of the dispensing valve.

Dispenser 100 is comprised of a finned rear segment 72, a chamber 56, a centrally apertured 88 front nozzle 70 having an exit bore 90, an upper retaining assembly 62 and a push-bottom 58 actuator. Front nozzle 70 sealed within the dispenser by frictional or rotational screw-like engagement of rearwardly protruding centrally apertured nozzle inlet 66 with chamber exit bore 67 within chamber 56. In its fully inserted position, laterally and peripherally extending shelf 68 of nozzle 70 abuts front shelf 74 of finned rear segment 72 and front shelf 80 of upper retaining assembly 62. Disposed within a forward compartment of rear segment 72 is chamber 56 held in place via insertion of at least one laterally extending projection into a mating recess in the forward compartment. Push-button 58 actuator is positioned and retained within the foam dispenser by laterally extending shelves or wings 78 which abut the apertures overlapping top surface of upper retaining assembly 62 and retaining clips 104. Push-button valve 58 is biased in its closed position, i.e., laterally extending apertures 84 within circular projections 82 are not in fluid alignment with either the centrally disposed inlet bores 102 within ribbed inlet tubes 64 or chamber exit bore 67. Resilient upward biasing is effected by the incorporation of extension piece 96 in contact with a bottom split wall 98 of the dispensing nozzle defining movable resiliently flexible flap 76 of rear segment 72. Only upon positive downward engagement by a user of the nozzle will the horizontal laterally extending apertures 84 with raised lips about a periphery at both ends of the apertures, move into essentially leak-proof fluid alignment with inlet bores 102 and chamber exit bore 67 and nozzle entrance bore 88 egressing through nozzle tip 90. In an optional embodiment the nozzle will further incorporate a secondary biasing means, e.g., a spring 99 for insuring that push button 58 remains in a closed position unless purposefully depressed and activated by an end user.

As an additional safety feature preventing against accidental or premature activation of the canisters through depression of the valves, a safety insert 48 may be incorporated into the assembly. This insert has a pair of legs 42 with extensions 59 which are insertable into receiving apertures 49 positioned within lowered surface 38. With the safety inserted, it is not possible for the inner pair of clips 40 to penetrate through apertures 49 for locking engagement with lowered surface 38.

The Prior Art however, has several limitations which are addressed in the present invention discussed hereinbelow.

Figure 8A:
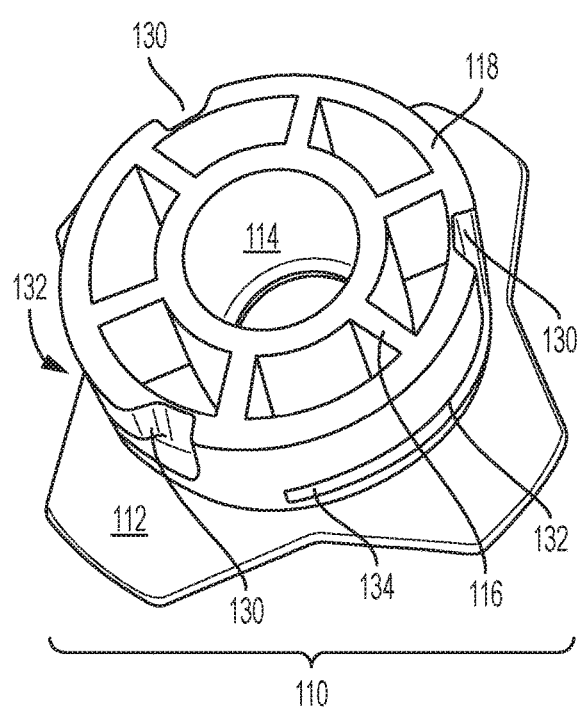
FIG. 8A is a top perspective view of a cylinder actuator bottom.
Figure 8B:
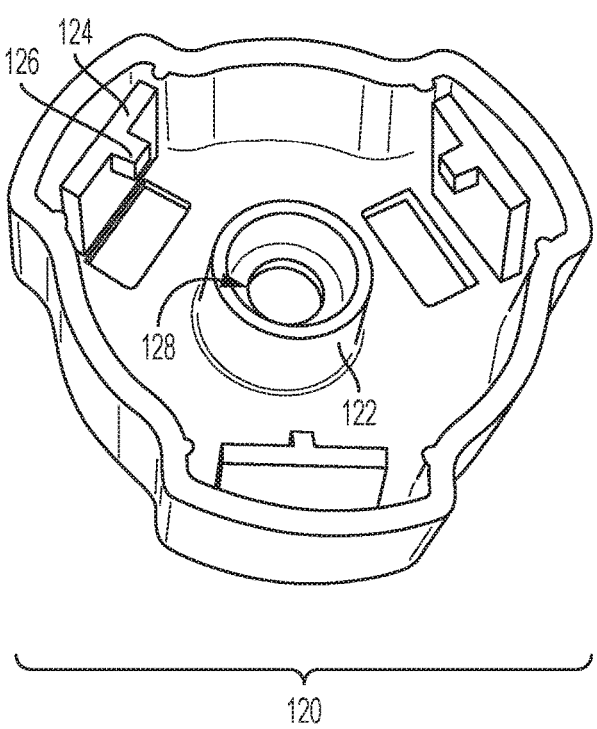
FIG. 8B is a top perspective view of a mating and insertable cylinder actuator top.
Figure 9:
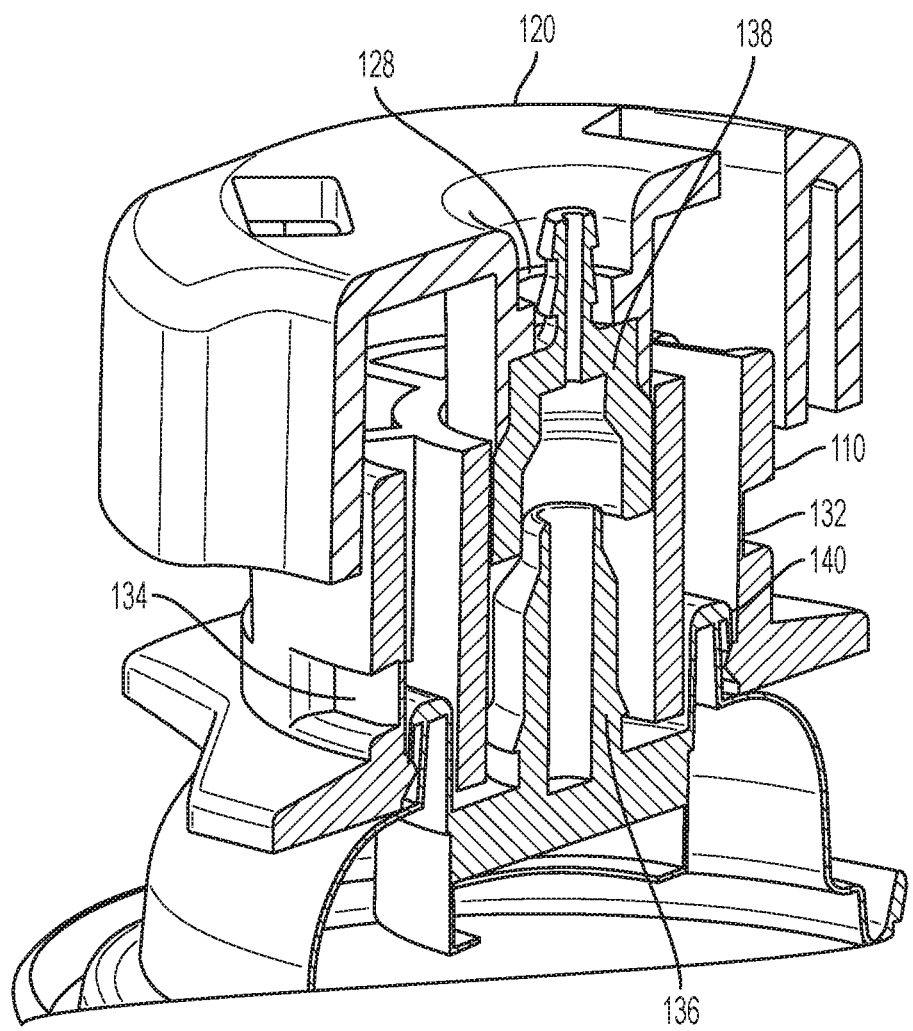
FIG. 9 is a partial cut-away view of a mating cylinder actuator bottom and top affixed to the hemispherical collar of a cylinder.
Figure 10:
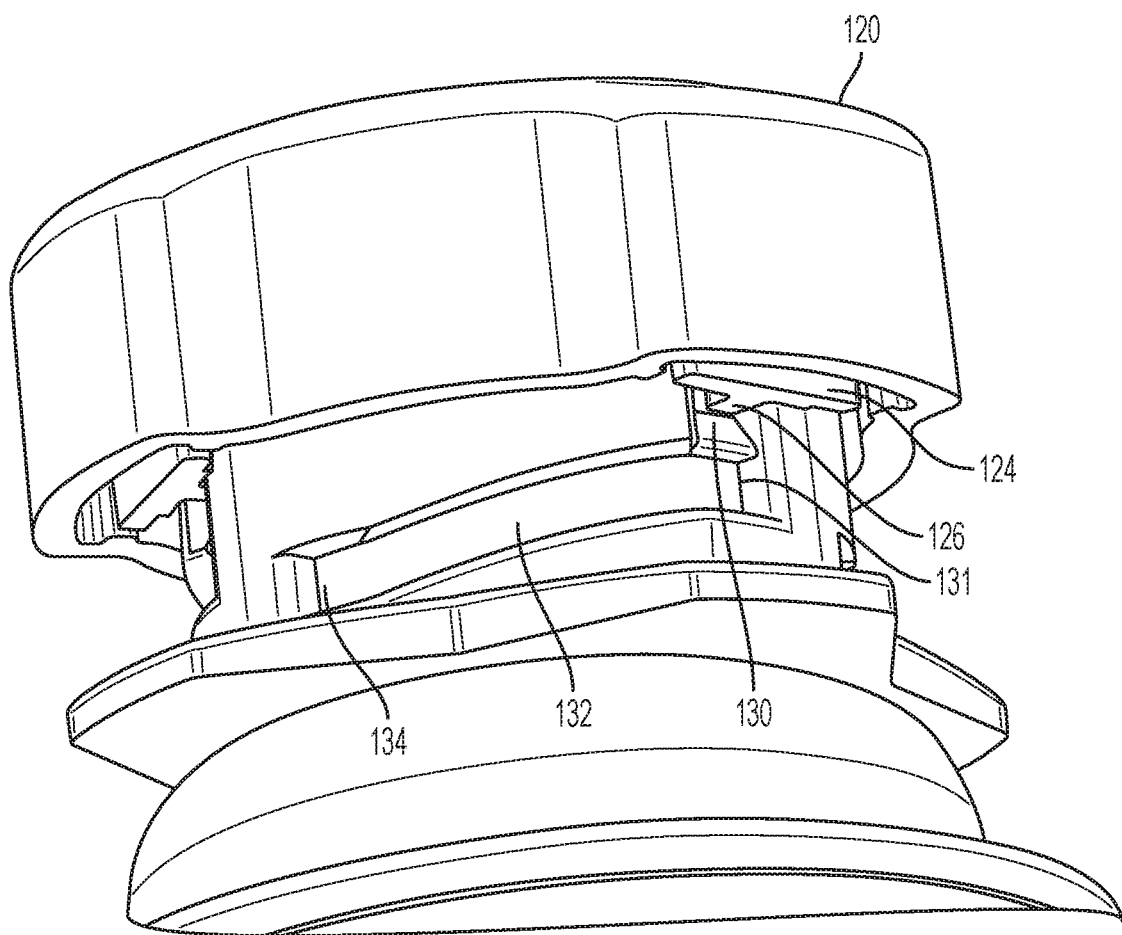
FIG. 10 is a perspective view of the cylinder actuator top in the first detent position of the cylinder actuator bottom.

While the dispensing assembly is preferably used to dispense polyurethane foams, any pressurized fluid (gas, liquid, semi-solid or combinations thereof) is capable of being dispensed. Additionally, the invention is not limited to any one foam or polymer and additionally, is not limited to two canister two-component "A" and "B" systems. When the foam to be dispensed is a one-component system, the dispensing apparatus will operate with two canisters, each containing the same or different one-component compositions, and each canister positioned in the locations identified for the A and B components previously. In an alternative embodiment, the assembly will function with only one canister, said canister positioned in either of the two locations indicated previously, or positioned more centrally between those locations. Unlike the Prior Art identified in FIGS. 1-7, the present invention does not employ a combined two-component top housing assembly 4 (as shown in FIG. 1) in which both canisters are activated simultaneously by user interaction. As illustrated in FIGS. 8(A) and 8(8), the improved foam dispensing gun employs an independent multiple detent mating component approach to independent cylinder activation of the "A" and "B" cylinders. Cylinder actuator bottom 110 has a bottom with a plurality of wings 112, a central aperture 114 and a plurality of ribs extending in a spoke-like manner from aperture 114 to outer peripheral collar 118. This outer collar has at least two, preferably three detents 130 positioned on the exterior of the collar. Greater and lesser numbers of detents are envisioned within the scope of this invention. Each uppermost first detent 130 is preferably longitudinally axially connected to a second detent 131, and descending spiral peripheral slot 132 which extends about a portion of the periphery of the collar and which terminates in third detent 134. Cylinder actuator top 120 has at least two, preferably three resiliently movable fingers, but in all cases, the number of first detents will equal the number of resiliently movable fingers. Each finger will have a projection 126 projecting into an interior of the actuator top. Cylinder actuator bottom 110 interfaces with cylinder actuator top 120 by initial axial mating engagement of first detent 130 with resiliently movable finger 124 and projection 126 of cylinder actuator top 120 by positioning of the same in overlapping relationship. Cylinder bottom 110 has a central aperture 114 into which is positioned cylinder top aperture 128, the combined opening of which is inserted valve stem 136 of cylinder "A" or cylinder "B", slidingly positioned within cylinder collar 140. Securely attached upon valve stem 136 in a leak-proof manner, is valve stem inlet hose insert 138. When resiliently movable projection 126 is in its first detent position (storage/shipping position) 130, the cylinders are non-operative as valve stem 136 and valve stem inlet hose insert 138 remain in a non-engaged (or non-pressurized) position with the pressurized cylinder contents. By employing downward axial movement, resiliently movable projection 126 is directed from first detent 130 into second detent position 131 (see FIG. 10). Continued rotational movement about the longitudinal axis of either cylinder, i.e., along descending peripheral slot 132, cylinder actuator top 120 is forced downward in a longitudinally axial direction. Upon resiliently movable projection 126 reaching the end of descending peripheral slot 132, the projection reaches third detent 134 with concurrent activation of the pressurized contents of either the "A" or "B" cylinders as the downward movement of cylinder actuator top 120 coaxially exerts downward movement of the cylinder valve stem 136 which pressurizes the delivery hoses 142 (shown in FIG. 11) which are affixed to valve stem inlet hose insert 138. While three detent positions have been described above, only the first detent is a physical depression in the classical sense of a detent. The second detent position is held in place by the bottom of the first detent coupled with a downward spiral of path 132. After complete rotation, the third detent position is held in place by the end walls of path 132. In a variation of the above depiction illustrated in FIG. 10, cylinder actuation may be effected by only employing a pair of detents in longitudinal axial relationship to each other. First detent position 130 and second detent position 131 can be in spaced apart longitudinally axial relationship to each other with second detent position 131 being separated by a sufficient distance so as to activate the pressurized contents of either the "A" or "B" cylinders by depression of valve stem 136 and valve stem inlet hose insert 138. In essence, the axial longitudinal compression which is illustrated by third detent position 134 is achievable by simply increasing the spacing between first detent 130 and second detent position 131.

Figure 11:
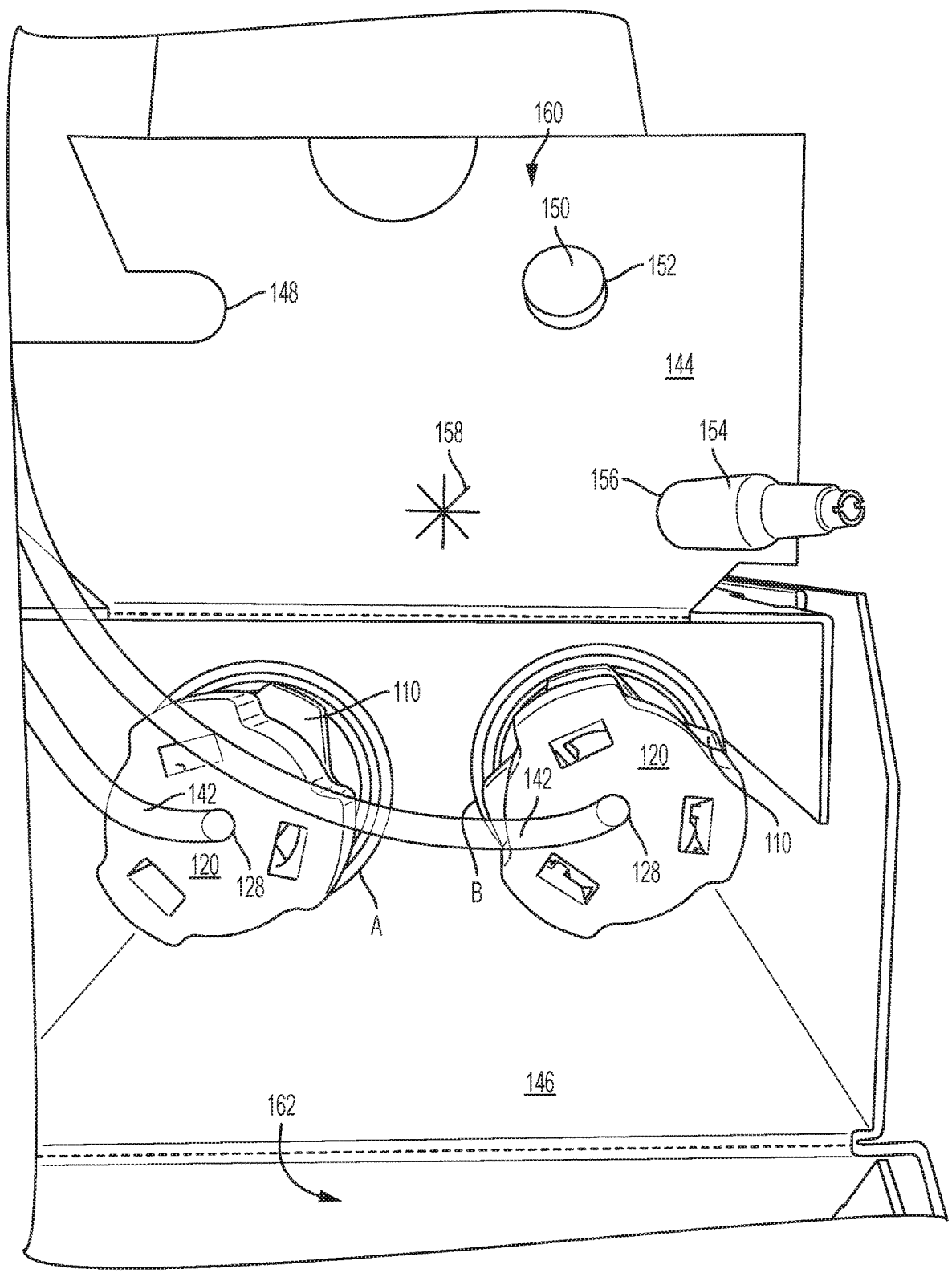
FIG. 11 is a top perspective view of two cannisters inside a container with actuator tops and bottoms affixed to the cannisters.
Figure 12:
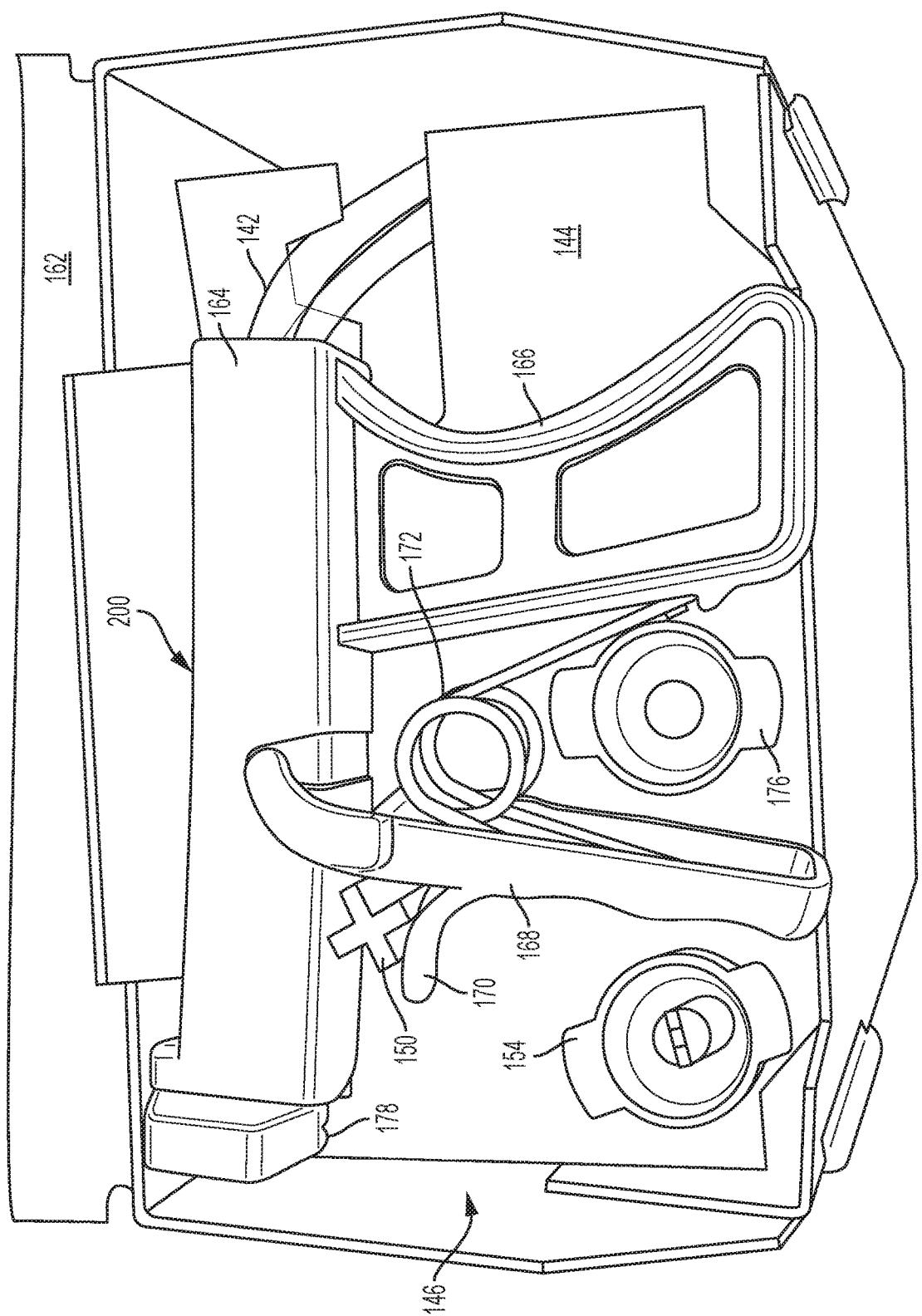
FIG. 12 is a top perspective view of the spray gun positioned within the top of an inner flap of the container, the trigger illustrated in a partially open position to prevent hose crimping during storage and shipment.
Figure 13:
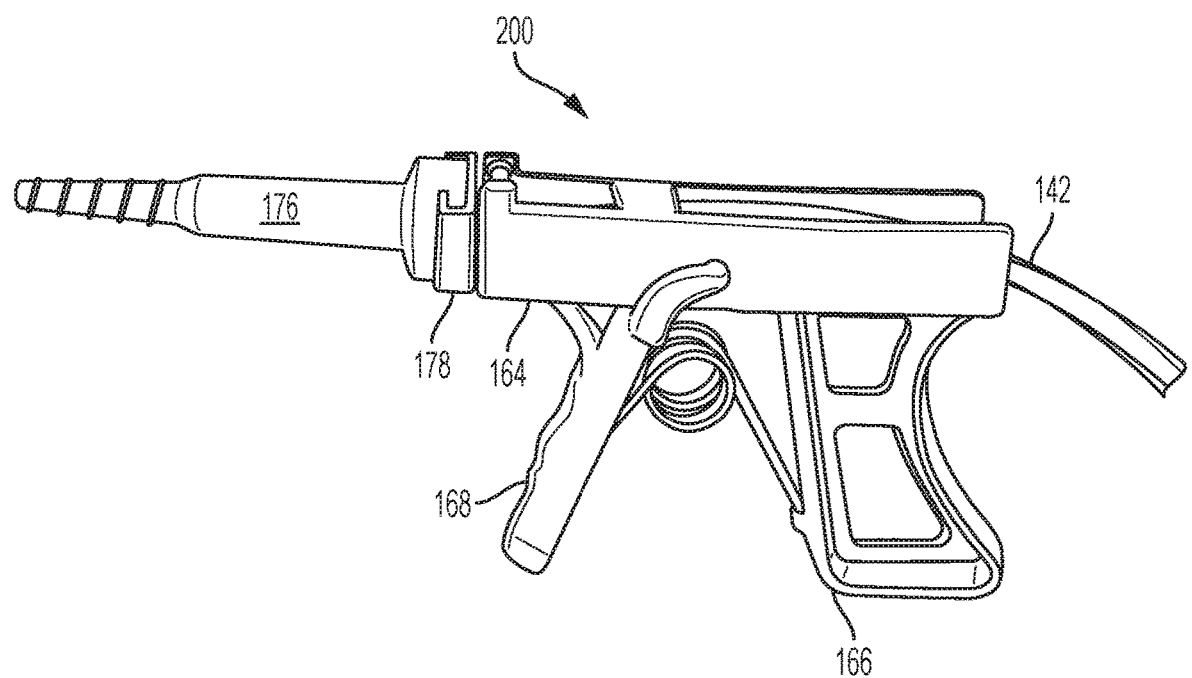
FIG. 13 is a side perspective view of the spray gun removed from the container.

As illustrated in FIG. 11, cylinders (or synonymously cannisters) "A" and "B" are positioned inside a container, typically a cardboard box 160 having an interior 146 and at least one lid, preferably two lids, an inner lid 144 and an outer lid 162. Inner lid has an aperture 148 through which hoses 142 project. Inner lid 144 additionally has a plurality of storage affixing locations, illustrated by hose-crimping prevention means 150 in combination with aperture 152 and nozzle 154 storage via aperture 156 and optionally aperture 158 for nozzle 176 (illustrated in FIG. 20). As better illustrated in FIG. 12, hoses 142 project through inner lid (or flap) 144 and enter the rear portion of housing 164 of foam spray gun 200. The gun has a longitudinally extending housing 164 and a handle projecting in a generally transverse direction to the longitudinal axis of the housing. Forward of the handle is trigger 168 (shown partially retracted in the figure by hose-crimping prevention means 150, which is positioned between trigger extension 170 and a bottom surface of housing 164. Trigger 168 is biased in a closed position by spring 172. Positioned within the inner flap is nozzle tip 154 and optional second tip 176. Either tip may be secured to the front of housing 164 by tip connector 178, which permits removable insertion of the dispensing assembly which is discussed in more detail below. FIG. 13 illustrates spray gun 200 with hose-crimping prevention means 150 removed as would occur in actual operation of the spray gun.

Figure 14:
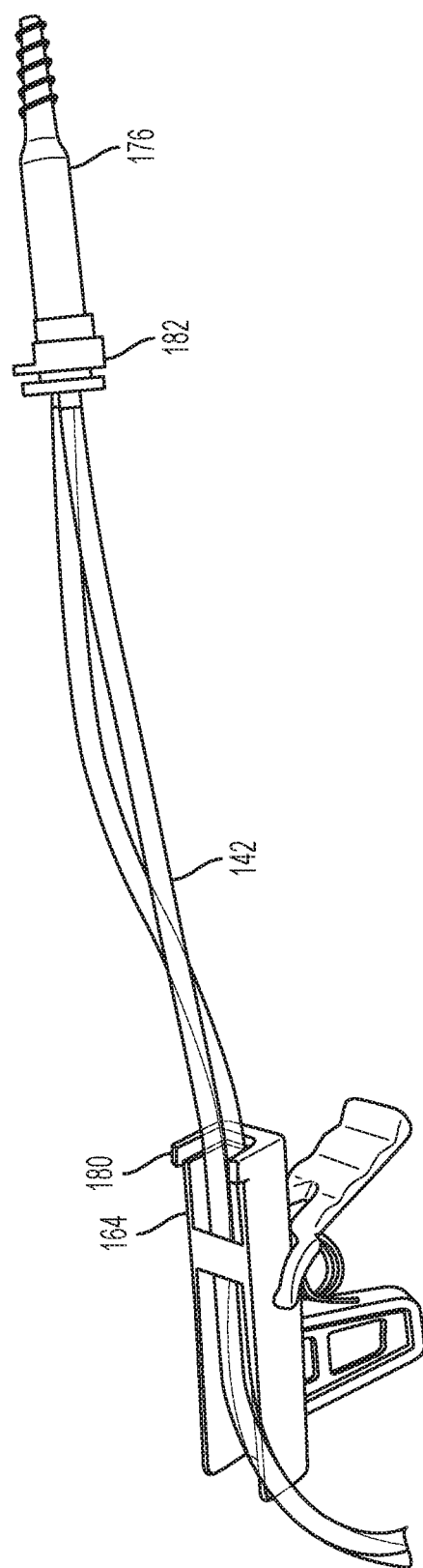
FIG. 14 is perspective view of the spray gun tip removed from the front of the spray gun housing.
Figure 15:
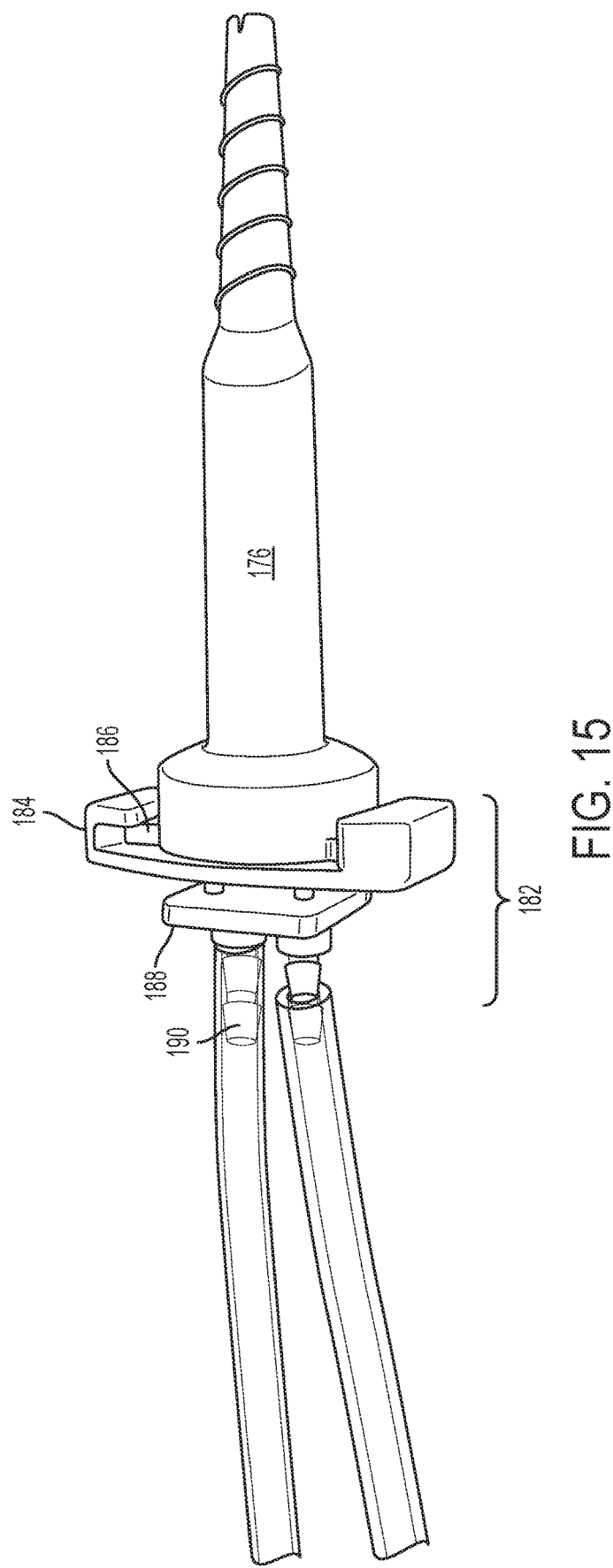
FIG. 15 is an enlarged view of the tip of the spray gun removed from the front of the spray gun housing.

FIGS. 14-15 illustrate the unique ability of a user to easily extend the reach of spray gun 200 and its nozzle into hard-to-reach areas. In FIG. 14, nozzle tip 176 is shown separated from the front of spray gun housing 164. Nozzle tip 176 is positioned by insertion into nozzle tip holder 182 which is removably attached to the front of nozzle housing 164 by the mating geometry of the front of the nozzle housing 180. The front of the housing has an essentially grooved semicircular surface into which a mating semicircular surface projection 188 is inserted. While the groove of the front of nozzle housing 180 is illustrated as semicircular as is the mating semicircular surface projection 188, there is no reason to limit the shape to semicircular. The shape could be rectangular or "n"-shaped polygon. The key is that the surfaces mate with each other. Similarly, for various applications nozzles with different degrees of angularity to the tip of the nozzle are useful in this invention, each different type of angularity, providing a different foam spray pattern. Nozzles 176 are interchangeable through the mating geometry of projecting wings of the rear of the nozzle tip and inwardly-facing mating slots 184 in nozzle holder 182. Nozzle hoses 142 are affixed typically via friction insertion onto projecting cylindrical rods 190, typically having barbed gripping surfaces, better illustrated in FIG. 16, affixed to the rear of surface projection 188.

Figure 16:
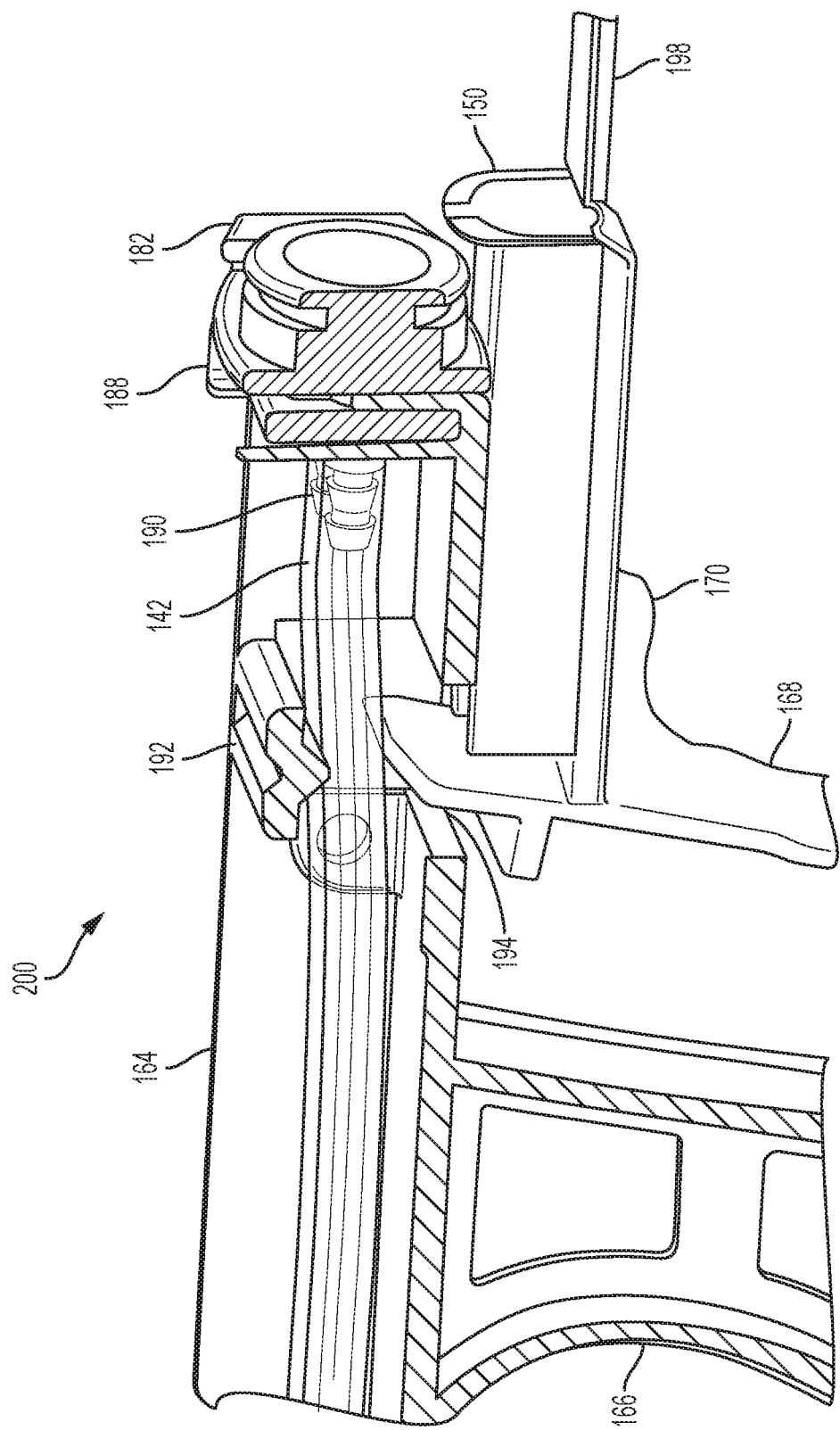
FIG. 16 side view in partial cut-away of the spray gun with anti-crimping means positioned between the trigger and bottom of the housing.
Figure 17:
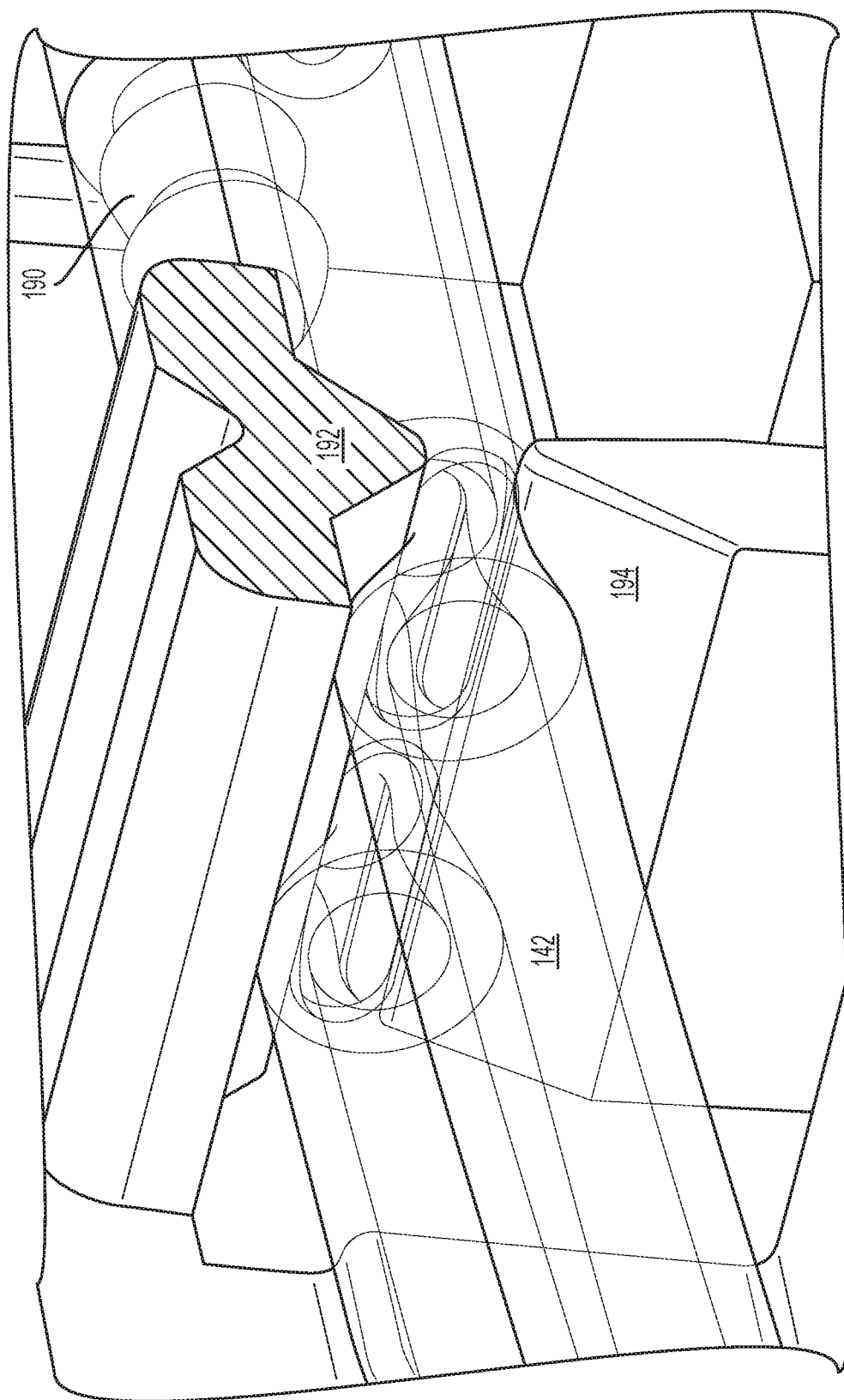
FIG. 17 is an enlarged view of the pinching flow control mechanism.
Figure 18:
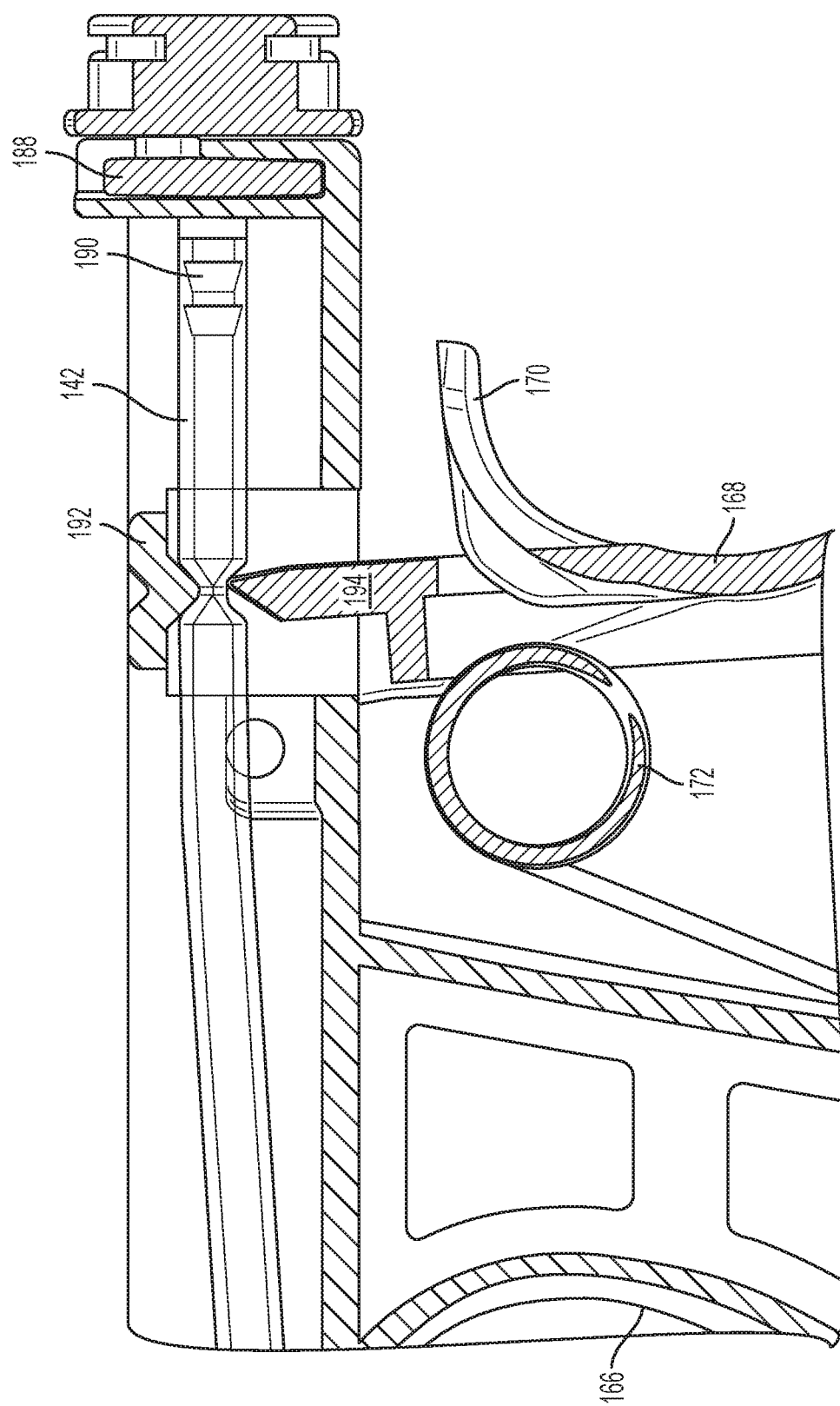
FIG. 18 a side view in partial cut-away of the pinching control mechanism of FIG. 17.
Figure 20:
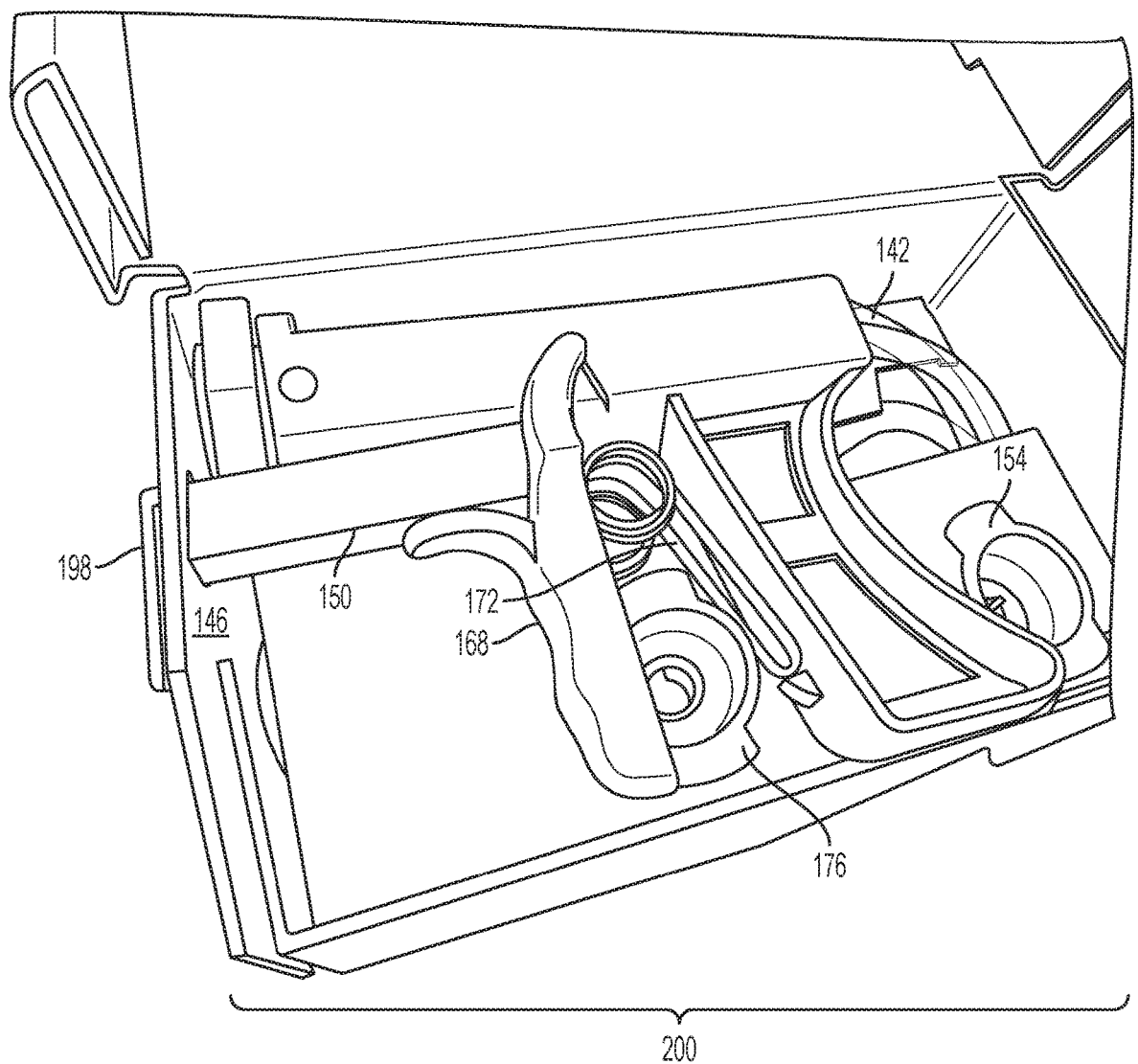
FIG. 20 is a top perspective view of FIG. 16 illustrating a portion of the safety protruding from one side of the container.
Figure 21:
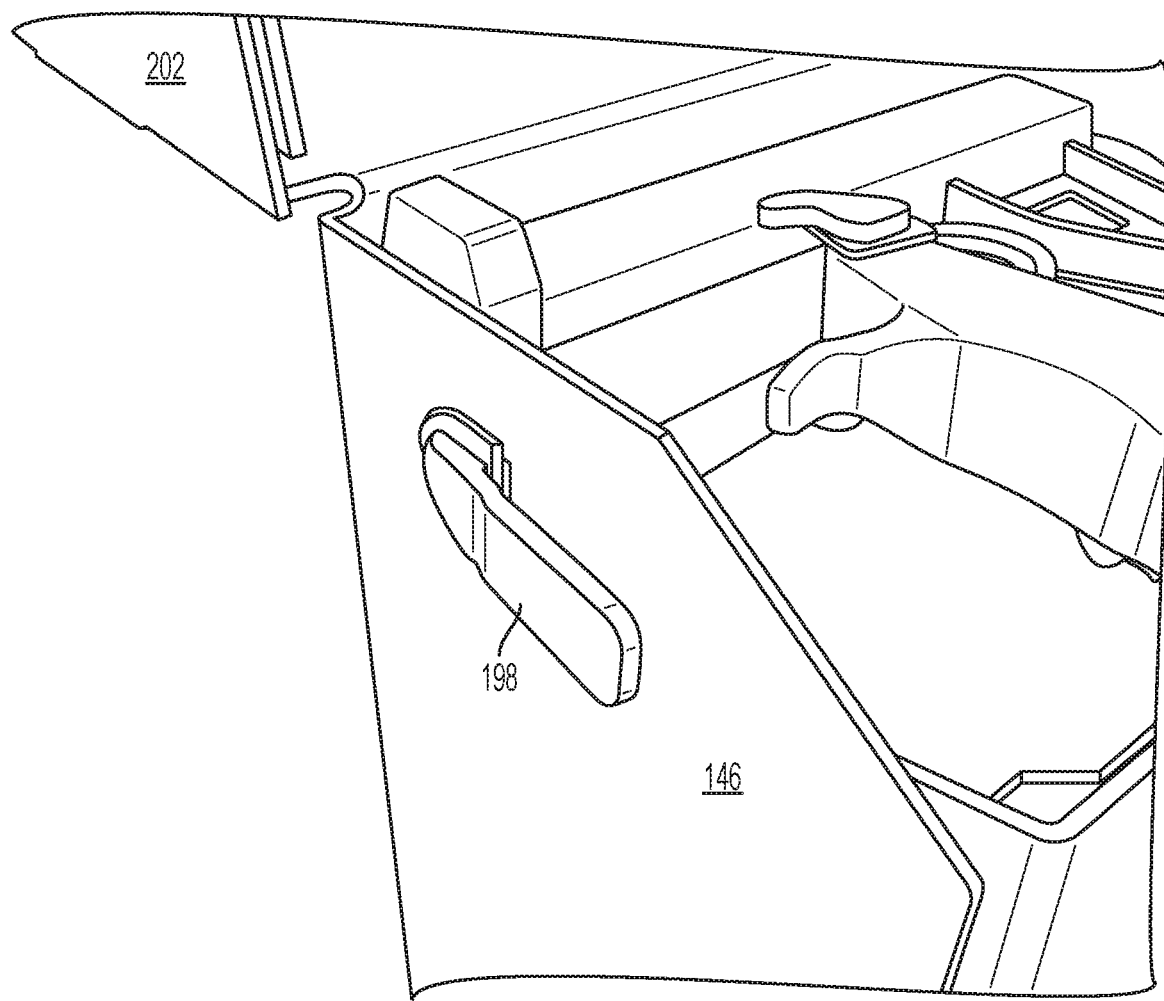
FIG. 21 is a side perspective view of FIG. 20.
Figure 22:
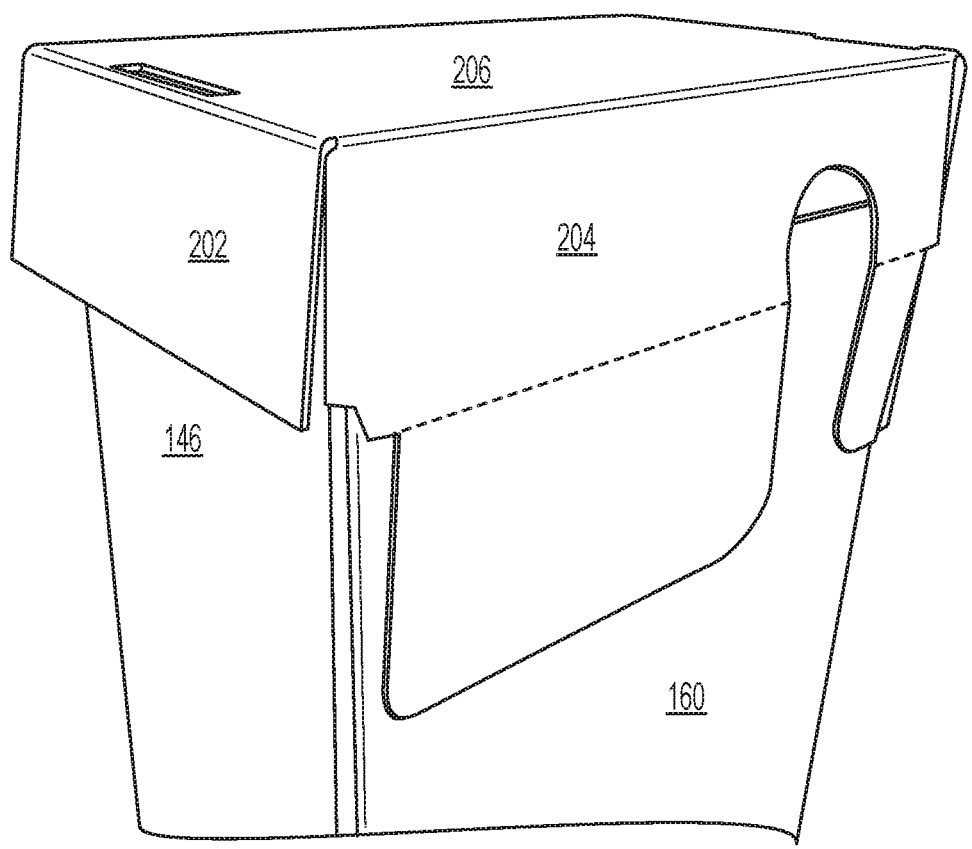
FIG. 22 is a side perspective view of FIG. 21 with the top lid closed.

Another improvement over the Prior Art is illustrated in FIGS. 16-18. Flow control for spray gun 200 is achieved by fully opening and fully closing plastic hoses 142 by pinching fixed v-shaped edge 192, positioned across a top of the housing and pivotable and movable edge 194 together. When trigger 168 is in its fully extended position, the edges are essentially adjacent each other as illustrated in FIG. 18 and when the trigger is in its fully contracted position, the edges are not in contacting engagement with plastic hoses 142 as illustrated in FIG. 16. The value of this approach is that accidental premature use of spray gun 200 is prevented. However, there is shape retention memory in plastic hoses 142, which depending on the length of storage in the closed position, may prevent full flow of the chemicals through plastic hoses 142 when trigger 168 is in its fully retracted (or open) position. One solution to this problem is to ship the trigger in a partially closed position or even in the fully open position. This was illustrated by plastic insert 150 in FIG. 12, but equivalently is illustrated as an elongated plastic insert 150 (see FIG. 16) affixed between the upper finger rest 170 and the bottom of housing 164. Spray gun 200 is preferably shipped with plastic insert extension 198 extending through one side 146 of container 160 (better illustrated in FIGS. 20-21), thereby preventing the contents of either cannister from prematurely being accessed and the plastic hoses 142 from being deformed by impacting edges 192, 194. Partial closing of the edges is illustrated in FIG. 17 and complete closure is illustrated in FIG. 18. As illustrated in FIGS. 20-21, the plastic insert extension 198 is positioned between a container side 146 of container 160 and an upper side flap 202 of the container. The upper lid 206 is formed by the folding of opposed upper side flaps 202 and upper front flap 204 illustrated in FIG. 22.

Figure 19:
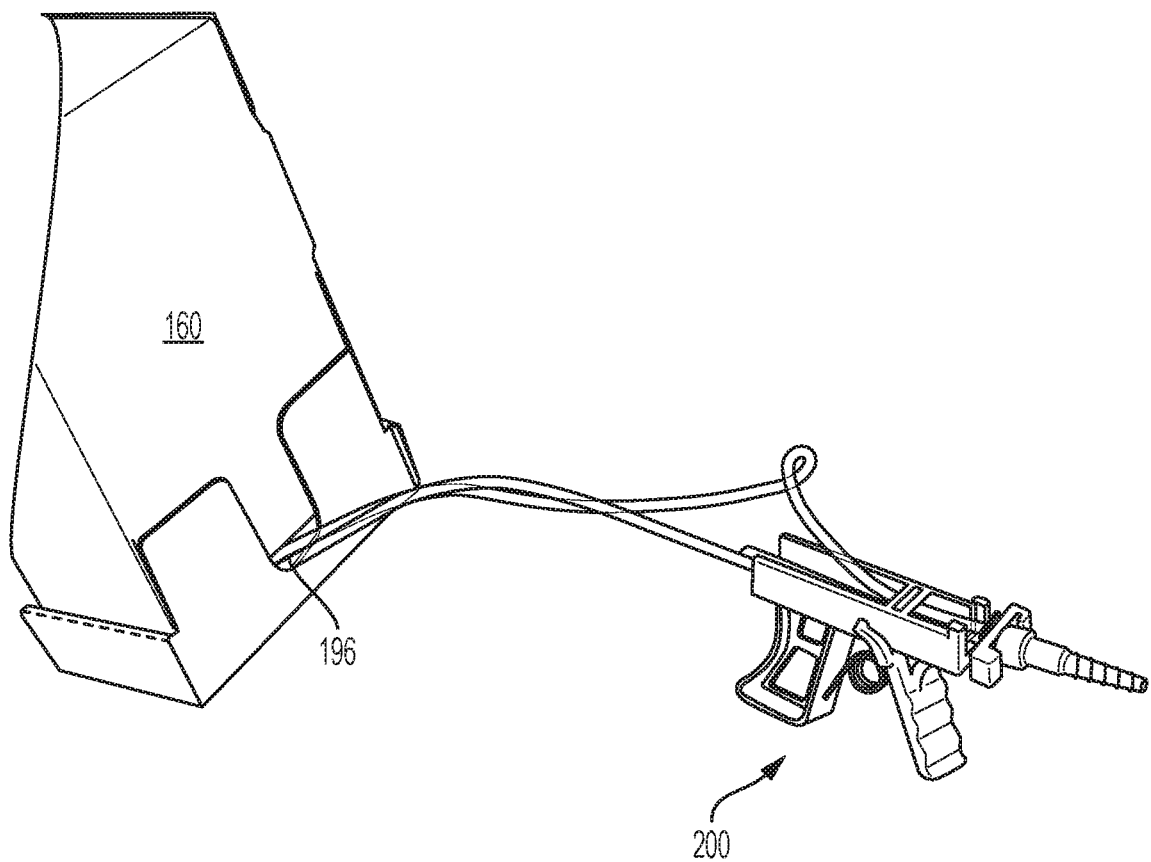
FIG. 19 is a view of the spray gun in use by an operator with spray tip slightly removed from the spray gun housing.
Figure 23:
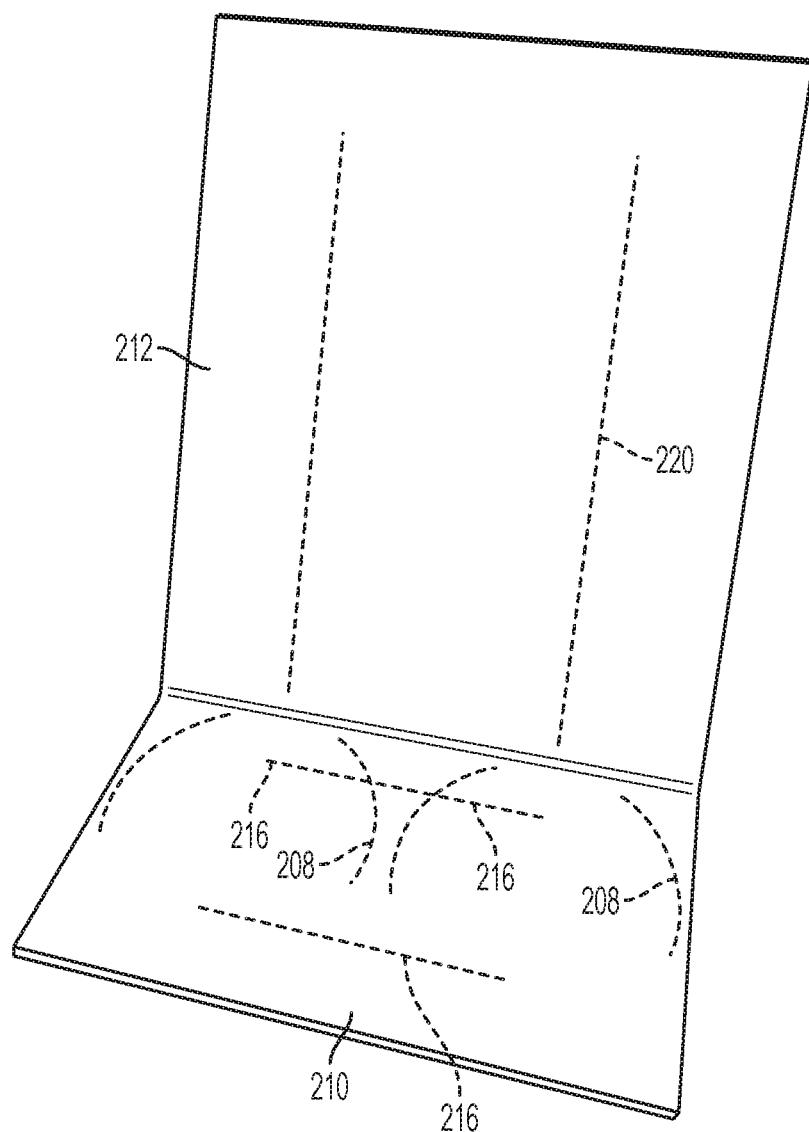
FIG. 23 is a perspective view of a cardboard insert used to keep the cannisters in-place.
Figure 24:
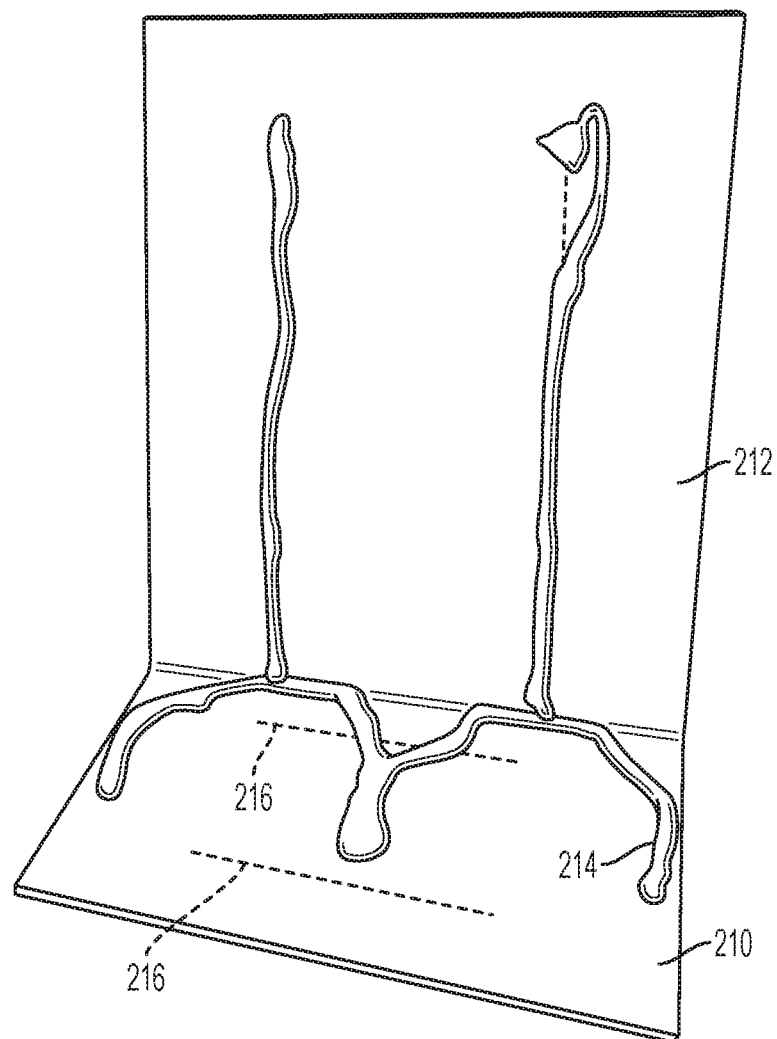
FIG. 24 is a perspective view of FIG. 23 illustrating a glue pattern.
Figure 25:
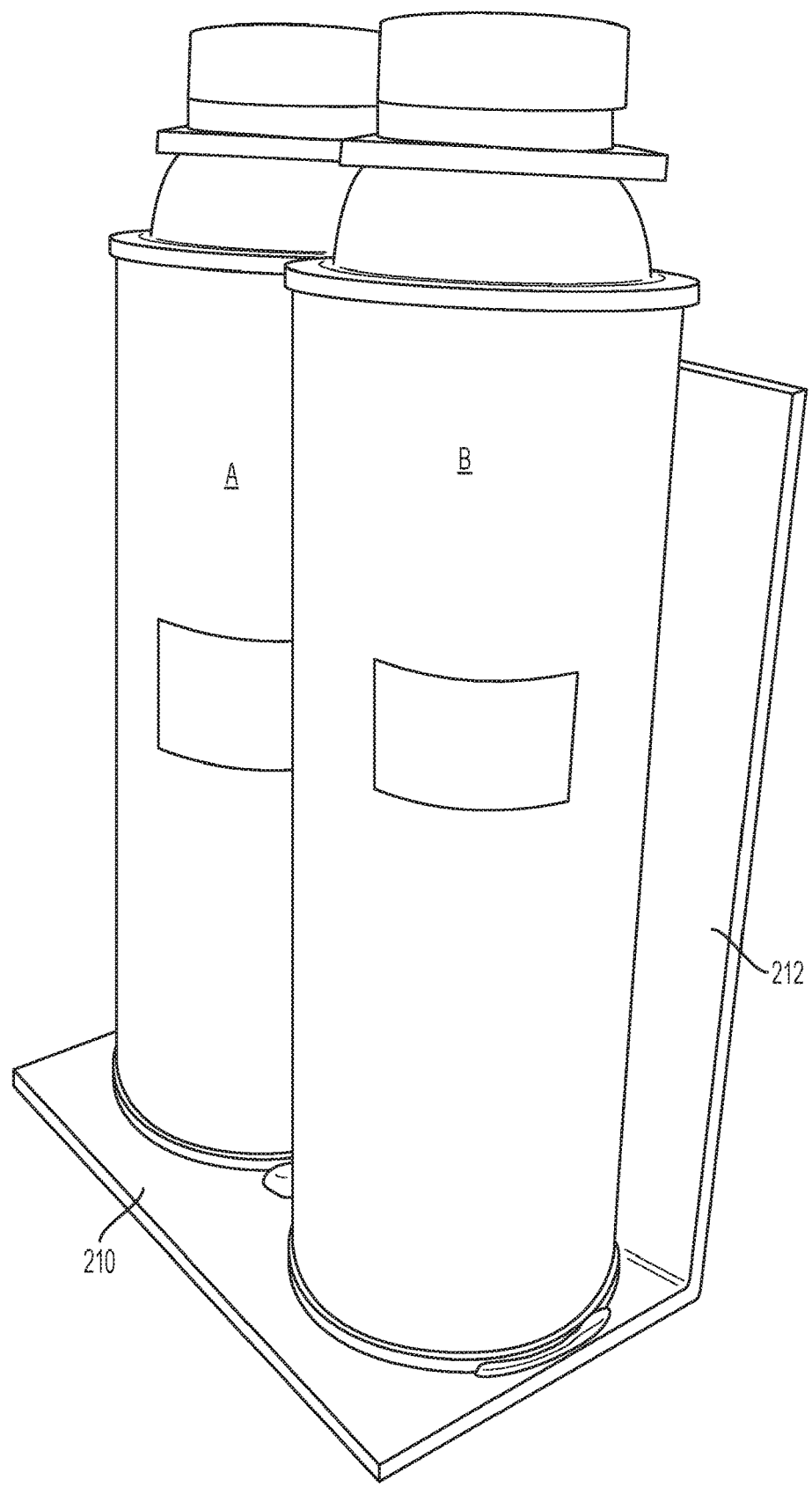
FIG. 25 is a perspective view of the cardboard insert with cannisters affixed to the insert.
Figure 26:
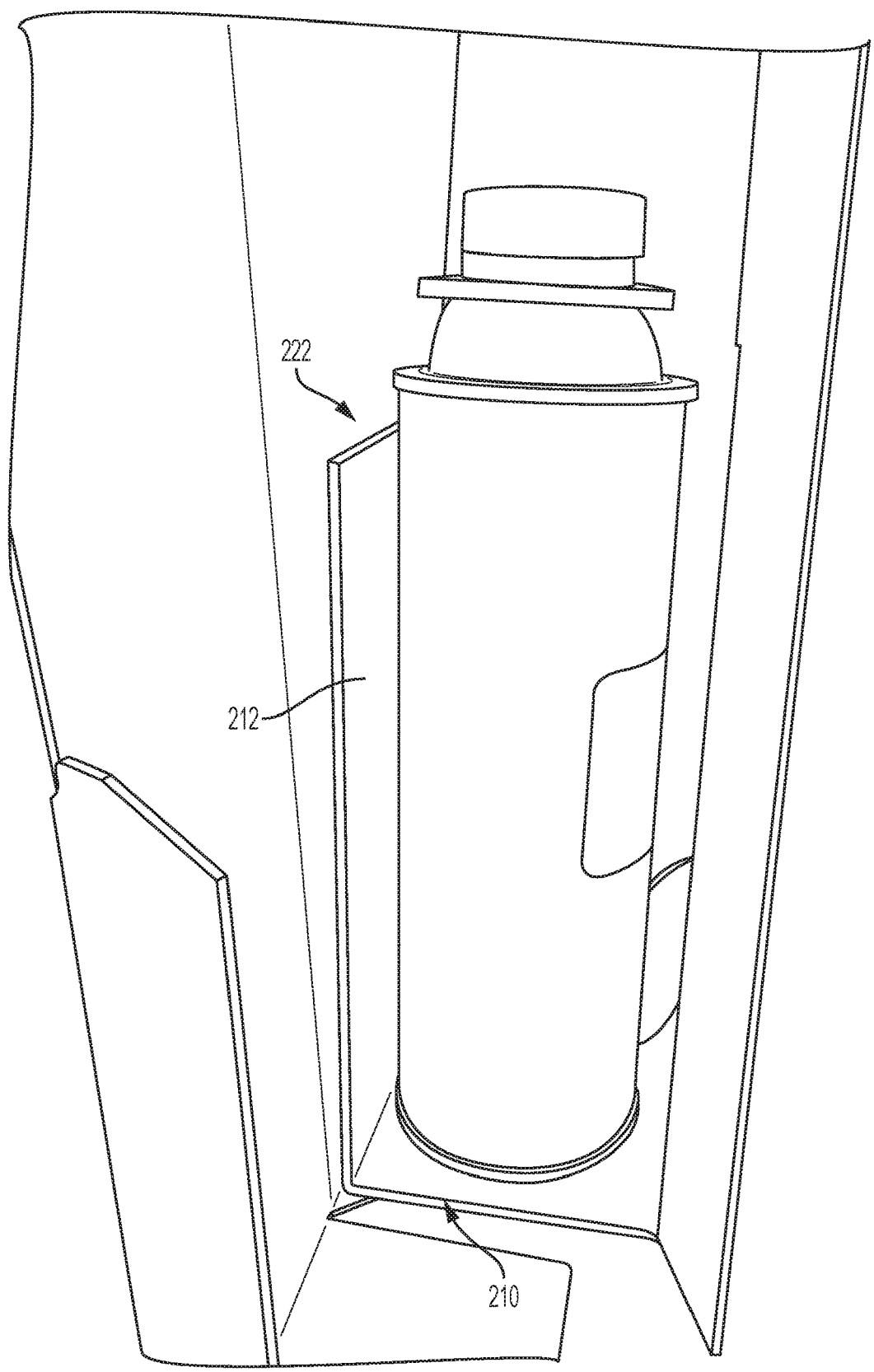
FIG. 26 is a perspective view of the cardboard insert with cannisters affixed to the insert and the combination inserted into the shipping container.

In operation, the cylinders are upside-down as illustrated in FIG. 19 with hoses 142 protruding through aperture 196. This allows essentially complete utilization of the contents of the "A" and "B" cylinders (or just one of the cylinders in the case of a one-component foam application) as well as permitting the operator to carry the carton 160 for use at the intended site application. In light of the upside-down nature of the use of the product, a cardboard insert 210 is typically provided to assist in holding the cylinders in place, as for example by locations 208 for the cylinder bottoms and locations 220 for the contacting side periphery of the cylinders as illustrated in FIG. 23. The application of a hot melt glue is illustrated in FIG. 24 by the pattern illustrated as 214 and as illustrated as 216, recognizing that alternatives to a hot melt glue include, but are not limited to: foam tape, double-sided tape or even cut-outs matched to the geometry of the cylinders. Cardboard insert 212 is affixed within the container by the application of a hot melt adhesive, as illustrated in FIGS. 24-26, although many locations are equally applicable as are other attachment means such as foam tape, double-sided tape or even cut-outs matched to the geometry of the cylinders.

Figure 27:
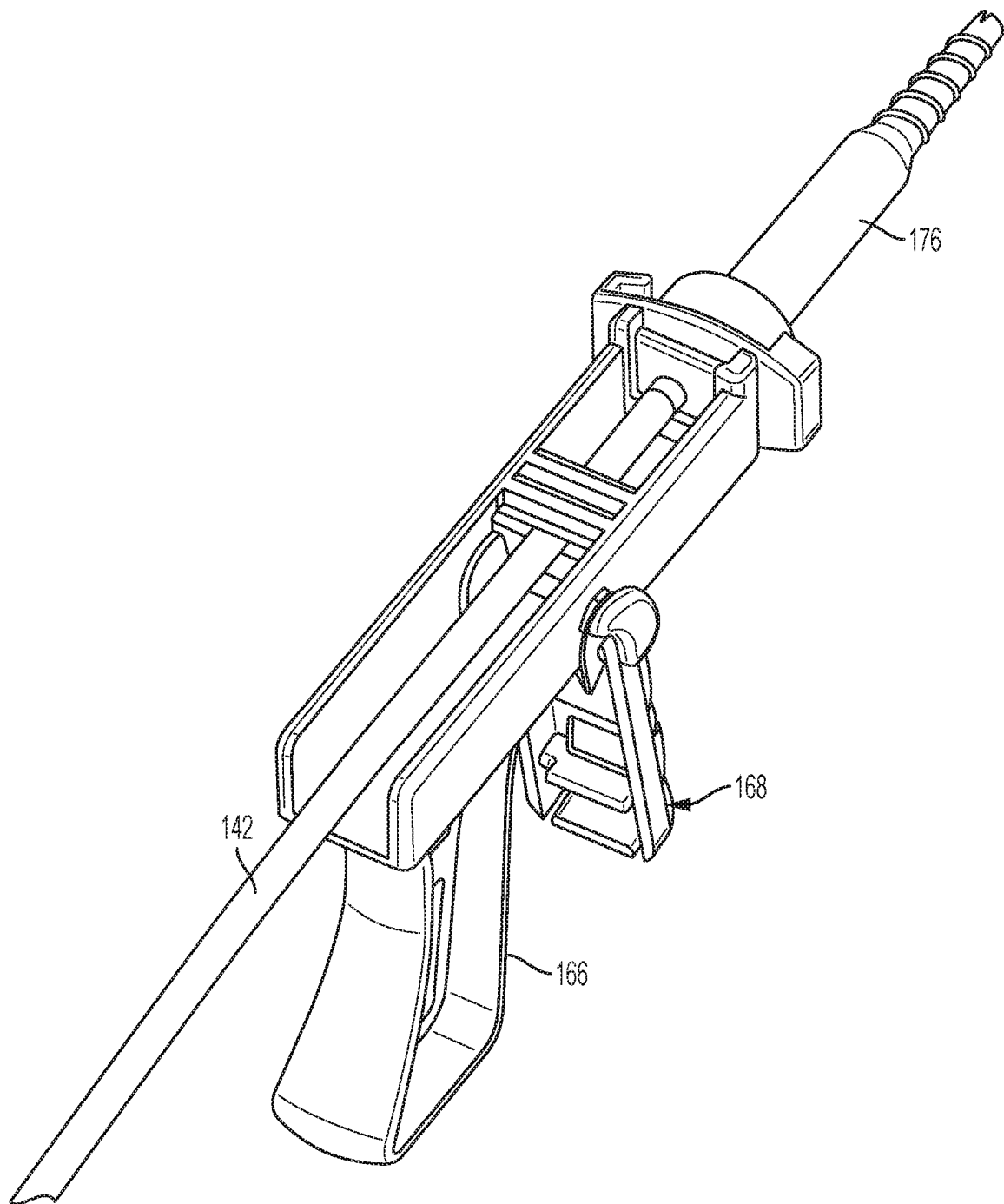
FIG. 27 is a perspective view of the spray gun when employed using a one-component foam.

While the focus of the application has been directed so far to "two-component" foams, particularly two-component polyurethane spray foams, the invention is not limited to such. In fact, the invention is broad enough to cover any pressurized fluid dispensing device. In fact, it is easily envisioned that one-component foams, particularly one-component polyurethane foams are easily adaptable to the fluid dispensing technology described herein. The major change being that only one cannister is required, employing one plastic hose 142 as illustrated in FIG. 27. This presents the opportunity to have one cannister within the container, or to have two one-component cannisters, the second cannister serving to allow the user to dispense more product by simply switching the single deformable plastic tubing from one cannister to the other. Alternatively, only one cannister may reside within the container.

Spray gun 200 is usable by one person. In operation, the spray apparatus is activated by removal of the hose pinching minimization means (either a foam insert or a plastic insert), followed by actuation of the cylinder contents by longitudinal axial movement of each cylinder actuation top from a first detent position to a second detent position, followed by independent rotation of each cylinder actuation top from the second detent position to a third detent position, the rotation of which independently depresses each cylinder valve. For use in difficult-to-reach areas, the operator has the flexibility of removing the nozzle tip from the gun housing to extend the reach of the nozzle tip and better and more easily complete the job.

At least one recurring quality issue facing the disposable polyurethane foam kit industry is the inability of end-users to effectively assess the core chemical temperature of the liquid and gas contents contained therein. Two important functions are often negatively impacted: achievement of maximum foam kit yield on the job site, and proper chemical cure of the "A" & "B" components.

Maximum yield is highly desired by purchasers of polyurethane foam kit products. If the chemicals are too cold for optimum use, the "B"-side viscosity increases, which in turn distorts the 1:1 ratio (by weight) required for proper yield. Lower-than-advertised yields carry significant economical consequences for the contractor.

Proper chemical cure (on-ratio ~1:1) is also critical to achieving maximum physical properties. It ensures that the cured foam meets building code specifications, e.g. fire ratings. In addition, a complete, on-ratio cure is critical for the health and safety of foam kit operators and building occupants. Again, cold chemical temperatures (below recommended) can create off-ratio foam, with the resulting incomplete chemical cure. While an on-ratio of ~1:1 is often targeted, it is recognized that kits could use different ratios by using different formulas or by using different pressures, thereby permitting different compositions as needed for the targeted end-use application.

At least one important variable impacting the above issues is the core chemical temperature of the liquid/gas contents of the foam kit. The core chemical temperature of a kit before use must meet the manufacturer's recommended temperature, usually ~75° F.-85° F., in order to meet the objectives of maximum yield and proper (complete) chemical cure. However, end-users typically do not condition the kits long enough at the recommended temperature. For example, kits stored in an unconditioned warehouse or insulation truck in the winter months may have a core chemical temperature of only ~40° F. If dispensed without being conditioned for a sufficient amount of time, the result is foam of very poor physical quality and appearance. Also, improper chemical cure will most likely occur (unbalanced ratio of "A" to "B" chemical, which is typically 1:1 by weight). This "off-ratio" foam becomes a liability for the reasons mentioned above. It can take up to 48 hours to condition cylinders to the recommended chemical temperature, a recommendation often ignored by end-users.

The industry has long searched for an effective, economical way to allow end-users to gauge the core chemical temperature of a kit with a reasonable degree of qualitative accuracy before applying the foam. This invention utilizes thermochromism in both the nozzle and the hoses associated with the "A" and "B" chemicals to determine when the temperature of the chemicals falls within the acceptable use range, based upon the color change of the nozzle or hose due to a change in temperature of the flowing chemical.

The ability to determine the chemical temperature as it exits the "A" and "B" cylinders through respective "A" and "B" flexible plastic hoses or the ability to determine the chemical temperature as it enters and/or exits the disposable nozzle is effected either by having a thermochromic material contained within the plastic used to mold disposable nozzle or to fabricate the flexible plastic hoses. Still another approach involves affixing a label either permanently using a permanent adhesive or non-permanently, using a pressure-sensitive adhesive (the label optionally having thermochromic text or thermochromic graphic material printed thereupon) which changes in one instance from colored (below the recommended use temperature), to colorless or a different color when the chemicals have transferred a sufficient amount of heat to the nozzle or label.

Thermochromism is typically implemented via one of two common approaches: liquid crystals and leuco dyes. Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 μm (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxyfluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3,3'-bis(p-dimethyl-aminophenyl)phthalide, 3,3-bis(p-diethyl-amino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenyl phenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. to transparent or translucent above 60° F. If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye. When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined in order to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color.

In addition to the above, it should be understood that many alterations and permutations are possible. Any of a variety of colors and shades can be mixed in order to undergo color changes as a function of temperature.

It is to be appreciated that the interaction between the "A" and "B" components within the nozzle are complex. Further, the words "laminar" and "turbulent" are not used herein in their strict, classical sense but are used in a relative sense. Flow within the inlet chamber of the nozzle is believed to be relatively turbulent, the thermochromic material changing color by measuring the temperature of either the high volume flow of pressurized chemicals or high volume flow of synthesized froth foam or both egressing through said plastic nozzle to illustrate to the end-user of the spray gun if the pressurized chemicals and propellant used to prepare the polyurethane foam or the polyurethane froth are at a minimum temperature e.g., for proper chemical cure of the "A" and "B" chemicals, the propellant comprising a fluorocarbon and an inert gas in which the propellant enters into the nozzle as a liquid component under the pressure of between approximately 80-120 psi and changes to a gaseous state component during travel through the nozzle and egress therefrom into the environment with turbulent flow between the liquid components, gaseous components and synthesized froth foam.

The propellant changes to a gaseous state component during travel through the nozzle and egress therefrom into the environment with turbulent flow between the liquid components, gaseous components and synthesized froth foam.

It is quite surprising that a "froth" foam within a nozzle flowing under turbulent conditions would yield a color-change within the nozzle. The heat transfer characteristics of a "froth" are not good. The "froth" would be in contact with the walls of the nozzle for a period of no longer than a second or so (and for most two-component spray systems using 80-120 psi pressure in the hoses would result in a residence time within the nozzle of the spray gun of milliseconds at a typical flow rate. The very short contact time coupled with the large amount of "void" space, which is inherent in the definition of a "froth foam" makes it quite surprising that any type of indication of temperature is possible in the nozzle of a spray foam gun. It is respectfully posited that it is completely counter-intuitive to believe that any indication of temperature is possible under these conditions. This is all the more remarkable in that foam is used as insulation . . . and for that very reason, its heat transfer characteristics are not good.

This invention has been described in detail with reference to specific embodiments thereof, including the respective best modes for carrying out each embodiment. It shall be understood that these illustrations are by way of example and not by way of limitation. The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A spray wand which comprises:
an essentially hollow elongated housing having a rear and a front;
a pivotable trigger biased in a forward direction;
at least one deformable plastic hose in leak-proof communication with a valve of at least one supply cannister at one end and in leak-proof communication with a rear inlet of a removable nozzle connector for a nozzle at an opposed end;
the nozzle connector comprising:
a means for removable mating engagement with the front of the housing at a rear end of the nozzle connector;
a means for removable mating engagement with a tapered wand tip at a front of the nozzle connector; and
a removable hose crimping prevention means for maintaining the at least one plastic hose with less than full deformation during storage or shipment, the hose crimping prevention means positioned between the bottom of the housing and the pivotable trigger of the spray wand, thereby preventing full forward extension while the crimping prevention means is positioned therein.

2. The spray wand of claim 1 wherein
the means for removable mating engagement with the front of the housing at a rear end of the nozzle connector is a mating semicircular female slot with a semicircular housing.

3. The spray wand of claim 1 wherein
the means for removable mating engagement with a tapered wand tip at the front of the nozzle connector is a mating pair of wings at a rear of the tapered wand tip with a pair of receiving slots at the front of the nozzle connector.

4. A spray wand which comprises:
an essentially hollow elongated housing having a rear and a front;
a pivotable trigger biased in a forward direction;
at least one deformable plastic hose in leak-proof communication with a valve of at least one supply cannister at one end and in leak-proof communication with a rear inlet of a removable nozzle connector for a nozzle at an opposed end;
the nozzle connector comprising:
a means for removable mating engagement with the front of the housing at a rear end of the nozzle connector, wherein the means for removable mating engagement with the front of the housing at a rear end of the nozzle connector is a mating semicircular female slot with a semicircular housing; and
a means for removable mating engagement with a tapered wand tip at a front of the nozzle connector.

5. The spray wand of claim 4 wherein
the means for removable mating engagement with a tapered wand tip at the front of the nozzle connector is a mating pair of wings at a rear of the tapered wand tip with a pair of receiving slots at the front of the nozzle connector.

6. The spray wand of claim 4 wherein
the at least one deformable plastic hose in leak-proof communication with a valve of at least one supply cannister at one end and in leak-proof communication with the rear inlet of a removable nozzle connector for the nozzle at the opposed end is two deformable plastic hoses.

7. The spray wand of claim 1 wherein
the at least one deformable plastic hose in leak-proof communication with a valve of at least one supply cannister at one end and in leak-proof communication with the rear inlet of a removable nozzle connector for the nozzle at the opposed end is two deformable plastic hoses.

8. A spray wand which comprises:

an essentially hollow elongated housing having a rear and a front;

a pivotable trigger biased in a forward direction;

at least two deformable plastic hoses in leak-proof communication with a valve of at least one supply cannister at one end and in leak-proof communication with a rear inlet of a removable nozzle connector for a nozzle at an opposed end;

the nozzle connector comprising:
- a means for removable mating engagement with the front of the housing at a rear end of the nozzle connector, wherein the means for removable mating engagement with the front of the housing at a rear end of the nozzle connector is a mating semicircular female slot with a semicircular housing; and
- a means for removable mating engagement with a tapered wand tip at a front of the nozzle connector.

9. The spray wand of claim 8 wherein the means for removable mating engagement with a tapered wand tip at the front of the nozzle connector is a mating pair of wings at a rear of the tapered wand tip with a pair of receiving slots at the front of the nozzle connector.

* * * * *